US012251689B2

(12) United States Patent
Choi et al.

(10) Patent No.: US 12,251,689 B2
(45) Date of Patent: Mar. 18, 2025

(54) GOLD NANOPARTICLE SUPERLATTICE EMBEDDED IN POROUS SILICA AND METHOD FOR MANUFACTURING SAME

(71) Applicant: Korea Advanced Institute of Science and Technology, Daejeon (KR)

(72) Inventors: Sung Min Choi, Daejeon (KR); Shin Hyun Kang, Sejong (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 175 days.

(21) Appl. No.: 18/065,572

(22) Filed: Dec. 13, 2022

(65) Prior Publication Data
US 2023/0278020 A1    Sep. 7, 2023

Related U.S. Application Data

(62) Division of application No. 16/333,998, filed as application No. PCT/KR2017/002203 on Feb. 28, 2017, now Pat. No. 11,565,245.

(30) Foreign Application Priority Data

Sep. 28, 2016 (KR) .......................... 10-2016-0124611

(51) Int. Cl.
| | | |
|---|---|---|
| *B01J 35/00* | (2024.01) | |
| *B01D 53/86* | (2006.01) | |
| *B01J 21/08* | (2006.01) | |
| *B01J 23/42* | (2006.01) | |
| *B01J 23/48* | (2006.01) | |
| *B01J 23/72* | (2006.01) | |
| *B01J 23/755* | (2006.01) | |
| *B01J 35/23* | (2024.01) | |
| *B01J 35/30* | (2024.01) | |
| *B01J 35/50* | (2024.01) | |
| *B01J 35/60* | (2024.01) | |
| *B01J 37/00* | (2006.01) | |
| *B01J 37/03* | (2006.01) | |
| *B01J 37/08* | (2006.01) | |

(52) U.S. Cl.
CPC ............ *B01J 35/23* (2024.01); *B01D 53/864* (2013.01); *B01J 21/08* (2013.01); *B01J 23/42* (2013.01); *B01J 23/48* (2013.01); *B01J 23/72* (2013.01); *B01J 23/755* (2013.01); *B01J 35/00* (2013.01); *B01J 35/30* (2024.01); *B01J 35/393* (2024.01); *B01J 35/50* (2024.01); *B01J 35/60* (2024.01); *B01J 37/00* (2013.01); *B01J 37/031* (2013.01); *B01J 37/08* (2013.01); *B01D 2255/106* (2013.01); *B01D 2255/30* (2013.01); *B01D 2257/502* (2013.01)

(58) Field of Classification Search
CPC .............. B01J 23/52; B01D 2255/106; B01D 2255/30; B01D 2257/502
See application file for complete search history.

(56) References Cited

U.S. PATENT DOCUMENTS

| | | | | |
|---|---|---|---|---|
| 11,565,245 | B2 * | 1/2023 | Choi ........................ | B01J 37/00 |
| 2004/0156770 | A1 * | 8/2004 | Hocevar ................... | B01J 23/83 |
| | | | | 423/247 |
| 2012/0225021 | A1 * | 9/2012 | Qian ...................... | A61K 47/10 |
| | | | | 977/773 |
| 2013/0189793 | A1 * | 7/2013 | Qian ........................ | A61P 35/00 |
| | | | | 436/172 |
| 2014/0170070 | A1 * | 6/2014 | Qian .................... | B01J 13/0034 |
| | | | | 436/171 |
| 2014/0213807 | A1 * | 7/2014 | Ichikawa ................ | B82Y 30/00 |
| | | | | 422/105 |
| 2018/0009036 | A1 * | 1/2018 | Mao .................... | A61K 41/0052 |

FOREIGN PATENT DOCUMENTS

JP         2014-509927 A     4/2014

OTHER PUBLICATIONS

C. Hamon et al., 8 Nanoscale, 7914-7922 (2016) (Year: 2016).*
E. Auyeung et al., 137 Journal of the American Chemical Society, 1658-1662 (2015) (Year: 2015).*
M. Lee et al., 10 Applied Materials & Interfaces, 22562-22570 (2018) (Year: 2018).*
Y. Chen et al., 18 Optics Express (2010) (Year: 2010).*
S Kang, "Highly Ordered Super lattice of Gold Nanoparticles Confined in Porous Silica Matrix", (Ph.D. Dissertation, May 29, 2015) ( Year: 2015).*
Hawley's Condensed Chemical Dictionary, p. 238 (16th ed., 2016, R.J. Larrañaga ed.) (Year: 2016).*
Y. Sun et al., 26 Chemistry of Materials, 5201-5207 (2014) (Year: 2014).*
Hiroki Hiramatsu et al., "A Simple Large-Scale Synthesis of Nearly Monodisperse Gold and Silver Nanoparticles with Adjustable Sizes and with Exchangeable Surfactants." Chemistry of Materials, Jun. 29, 2004, vol. 16, No. 13, American Chemical Society.
Youngmin Lee et al., "Surface- and Structure-Dependent Catalytic Activity of Au Nanoparticles for Oxygen Reduction Reaction", Chemistry of Materials, Jun. 24, 2009, American Chemical Society.
Katherine C. Grabar et al., "Preparation and Characterization of Au Colloid Monolayers", Analytical Chemistry, Feb. 15, 1995, vol. 67, No. 4, American Chemical Society.

(Continued)

*Primary Examiner* — Alexander R Pagano

(57) ABSTRACT

The present invention relates to a catalyst composition comprising a gold nanoparticle superlattice embedded in hierarchical porous silica and a method for manufacturing the same. The catalyst composition comprising a gold nanoparticle superlattice embedded in hierarchical porous silica according to the present invention comprises micropores and mesopores in the superlattice, so that these pores are channelized to allow the rapid access of reactants to surfaces of gold nanoparticles, and the catalyst composition is very structurally stable and has excellent catalytic activity, and thus has an effect of exhibiting a CO conversion rate of 100% at room temperature.

6 Claims, 24 Drawing Sheets

(56) References Cited

OTHER PUBLICATIONS

Evelyn Auyeung et al., "Controlling Structure and Porosity in Catalytic Nanoparticle Superlattices with DNA", Journal of the American Chemical Society, Jan. 22, 2015, American Chemical Society.
Yun-Sheng Chen et al., "Enhanced thermal stability of silica-coated gold nanorods for photoacoustic imaging and Image-guided therapy", Optics Express, Apr. 26, 2010, vol. 18, No. 9.
Min-Jae Lee et al., "Green Synthesis of High-Purity Mesoporous Gold Sponges Using Self-Assembly of Gold Nanoparticles Induced by Thiolated Poly(ethylene glycol)", Langmuir, May 25, 2016, American Chemical Society.
Lina Wu et al., "Large-scale gold nanoparticle superlattice and its SERS properties for the quantitative detection of toxic carbaryl", Nanoscale, 2013, The Royal Society of Chemistry.
Shin-Hyun Kang, "Highly Ordered Superlattice of Gold Nanoparticles Confined in Porous Silica Matrix", Kaist Ph. D. Dissertation, 2015, Kaist.
International Search Report for PCT/KR2017/002203, maild on May 16, 2017.

\* cited by examiner

GOLD NANOPARTICLE SUPERLATTICE EMBEDDED IN POROUS SILICA AND METHOD FOR MANUFACTURING SAME

CROSS-REFERENCE TO RELATED APPLICATION

This application is a division of U.S. application Ser. No. 16/333,998, filed on Mar. 15, 2019, which is a national stage application, filed under 35 U.S.C. § 371, of International Patent Application No. PCT/KR2017/002203, filed on Feb. 28, 2017, which claims the priority benefit of Korean Patent Application No. 10-2016-0124611, filed on Sep. 28, 2016 in the Korean Intellectual Property Office, which is incorporated by reference herein in its entirety.

TECHNICAL FIELD

The present invention relates to a catalyst composition comprising a gold nanoparticle superlattice embedded in hierarchical porous silica, a method for manufacturing the same, and a method for removing carbon monoxide (CO) using the same.

BACKGROUND ART

In most of the nanoparticle superlattices (NPSLs) reported so far, the superlattice is formed and maintained by the interaction between the organic ligand molecules attached to the surfaces of nanoparticles. For example, in the drying-mediated method, the ligand-induced interparticle interactions induce the self-assembly of nanoparticles in a superlattice according to the space filling rule as the solvent slowly evaporates. Also, in the DNA-mediated method, oligonucleotide-conjugated nanoparticles self-assemble into the desired superlattice structure due to the programming properties. However, the ligand-mediated interparticle interactions are easily destabilized and easily result in distortion or destruction of the nanoparticle superlattice, depending on environmental conditions. For example, nanoparticles in a nanoparticle superlattice formed by the drying-mediated method may be easily sintered at high temperatures. Also, the morphology of nanoparticle superlattices formed by the DNA-mediated method is easily distorted or lost when they are removed from an aqueous salt solution or heated to the DNA melting temperature or higher. Thus, the structural instability of nanoparticle superlattices limits their practical applicability. Especially, although the utilization of nanoparticle superlattices as catalysts is a very important area of application, it has been strongly restricted since most of the catalytic reaction conditions require the structural integrity of the nanoparticle superlattice.

Therefore, there is an urgent need to develop a nanoparticle superlattice that is very stable thermally and structurally and exhibits excellent catalytic activity.

SUMMARY OF INVENTION

Technical Problem

While studying nanoparticle superlattices (NPSLs), The present inventors have found that a gold nanoparticle superlattice embedded in hierarchical porous silica comprises micropores and mesopores in the superlattice, so that these pores are channelized to allow the rapid access of reactants to surfaces of gold nanoparticles, and that the catalyst composition is very structurally stable and has excellent catalytic activity, and thus has an effect of exhibiting a CO conversion rate of 100% at room temperature, and thereby completed the present invention.

Thus, an object of the present invention is to provide a catalyst composition comprising a gold nanoparticle superlattice embedded in hierarchical porous silica and a method for manufacturing the same.

Another object of the present invention is to provide a method for removing carbon monoxide (CO), comprising the step of oxidizing carbon monoxide (CO) using the catalyst composition.

Another object of the present invention is to provide a carbon monoxide (CO) remover comprising the catalyst composition.

Solution to Problem

In order to achieve the above objects,
the present invention provides a catalyst composition comprising a gold nanoparticle superlattice embedded in hierarchical porous silica.

Also, the present invention provides a method for manufacturing a catalyst composition, comprising the steps of:
preparing a dispersion of gold nanoparticles functionalized with thiolated poly(ethylene glycol);
adding a silica precursor to the dispersion of gold nanoparticles and stirring the dispersion to obtain a precipitate; and
calcining the precipitate in an inert atmosphere to prepare a gold nanoparticle superlattice embedded in hierarchical porous silica.

Also, the present invention provides a method for removing carbon monoxide (CO), comprising the step of oxidizing carbon monoxide (CO) using the catalyst composition.

Also, the present invention provides a carbon monoxide (CO) remover comprising the catalyst composition.

Advantageous Effects of Invention

The catalyst composition comprising a gold nanoparticle superlattice embedded in hierarchical porous silica according to the present invention comprises micropores and mesopores in the superlattice, so that these pores are channelized to allow the rapid access of reactants to surfaces of gold nanoparticles, and the catalyst composition is very structurally stable and has excellent catalytic activity, and thus has an effect of exhibiting a CO conversion rate of 100% at room temperature.

and Au-PEG-2 (gold nanoparticles functionalized by SH-PEG with a molecular weight of 2 kDa) prepared in Example 1-1.

Figure 6A:
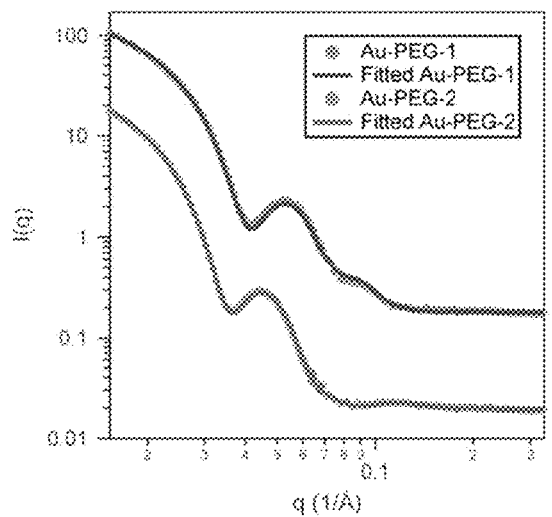
Figure 6B:
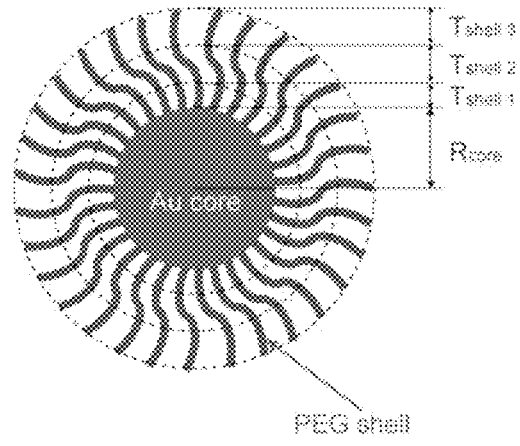

FIGS. 6A and 6B are diagrams showing the small-angle neutron scattering (SANS) measurement results of Au-PEG-1 (gold nanoparticles functionalized by SH-PEG with a molecular weight of 1 kDa) and Au-PEG-2 (gold nanoparticles functionalized by SH-PEG with a molecular weight of 2 kDa) prepared in Example 1-1 and the fitting results thereof.

Figure 7:
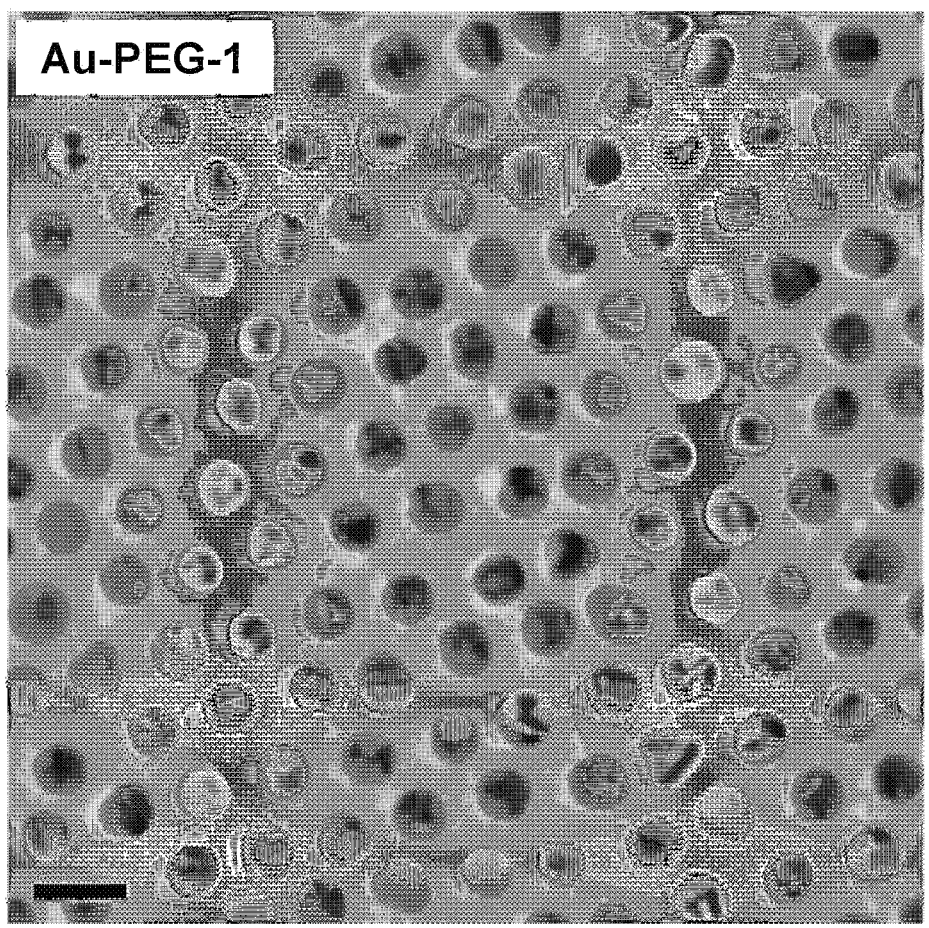

FIG. 7 is a transmission electron microscope (TEM) image of Au-PEG-1 (gold nanoparticles functionalized by SH-PEG with a molecular weight of 1 kDa) prepared in Example 1-1.

Figure 8:
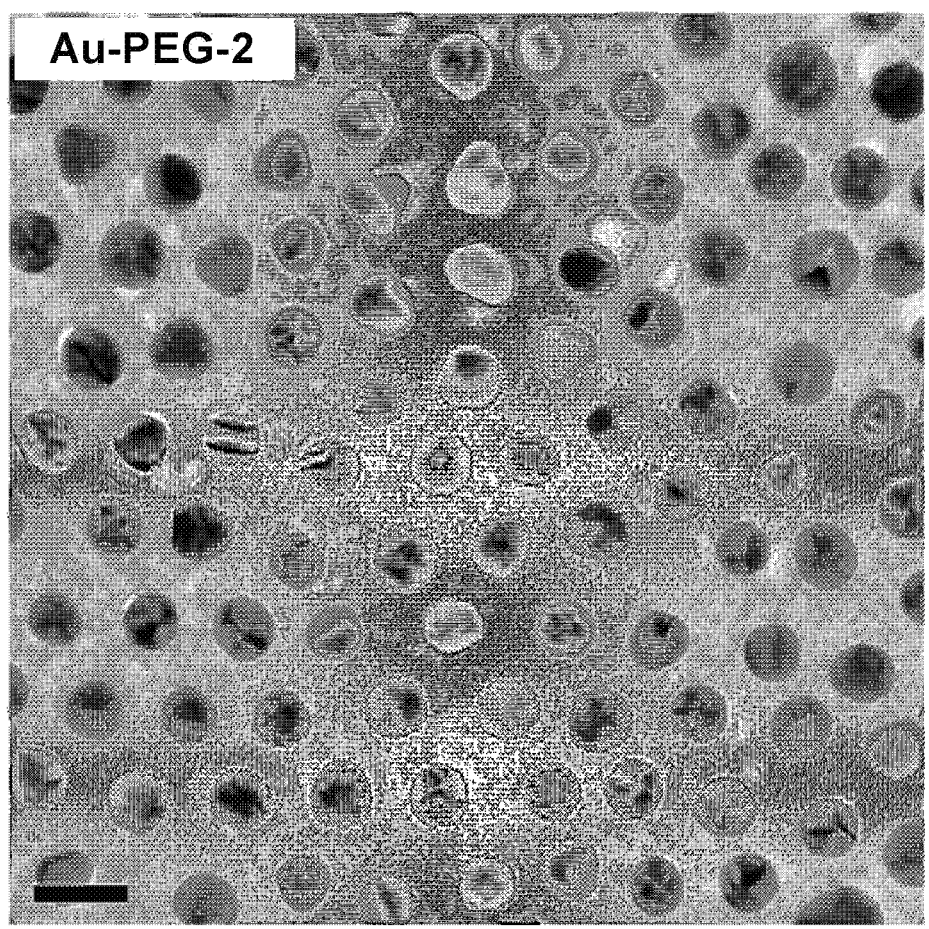

FIG. 8 is a transmission electron microscope (TEM) image of Au-PEG-2 (gold nanoparticles functionalized by SH-PEG with a molecular weight of 2 kDa) prepared in Example 1-1.

Figure 9:
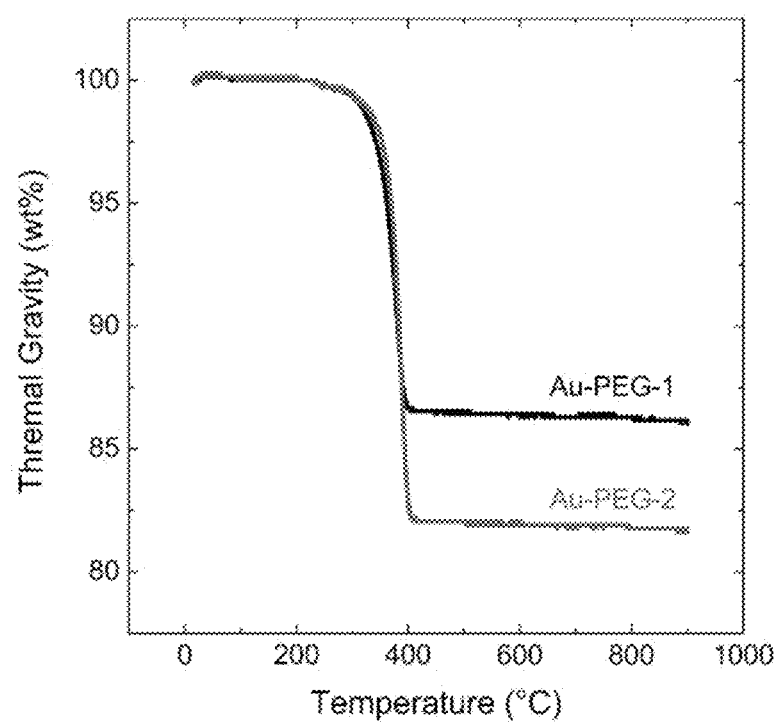

FIG. 9 is a diagram showing the thermogravimetric analysis results of Au-PEG-1 (gold nanoparticles functionalized by SH-PEG with a molecular weight of 1 kDa) and Au-PEG-2 (gold nanoparticles functionalized by SH-PEG with a molecular weight of 2 kDa) prepared in Example 1-1.

Figure 10:
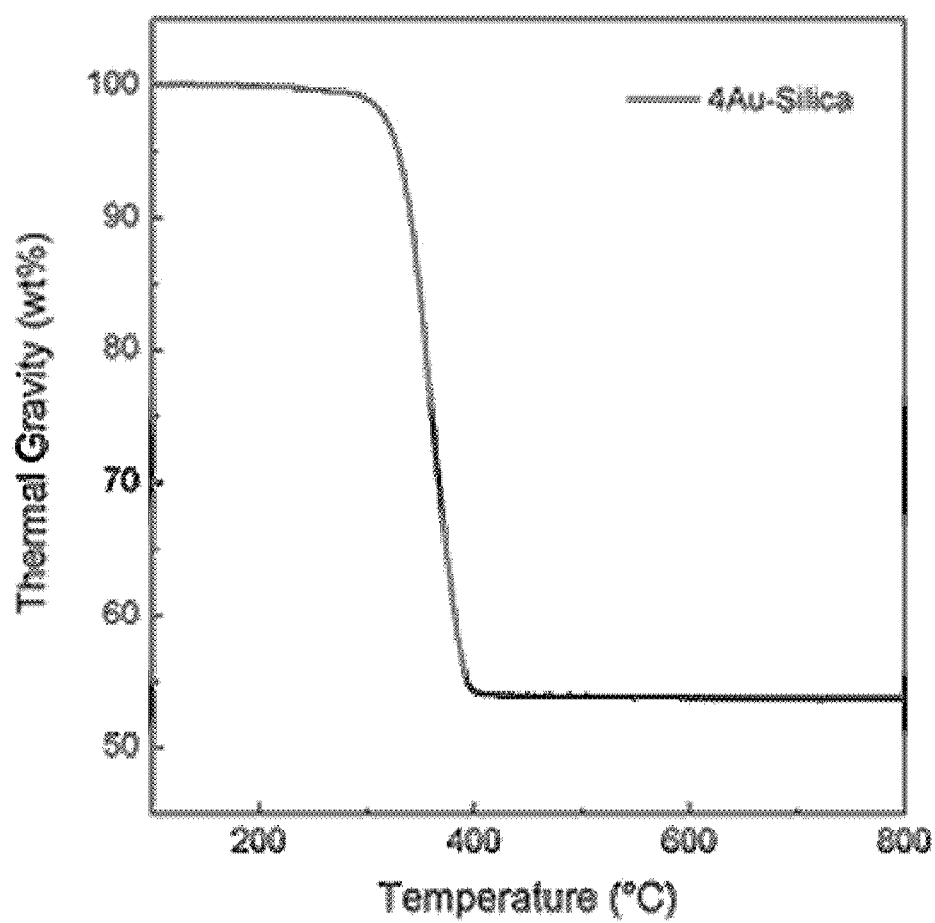

FIG. 10 is a diagram showing the thermogravimetric analysis of 4-Au-PEG prepared in Example 2-1.

Figure 11:
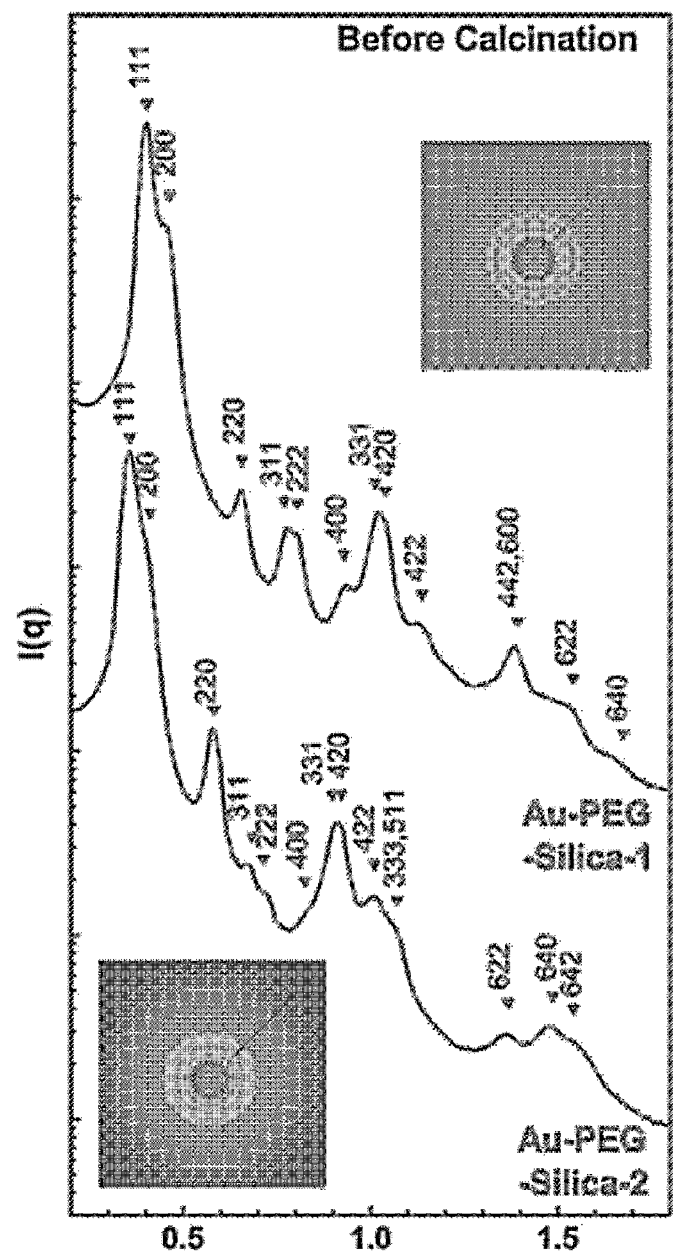

FIG. 11 is a diagram showing the small-angle X-ray scattering (SAXS) of Au-PEG-silica-1 and Au-PEG-silica-2 according to Example 1 before calcination. The inset illustrates the 2-D SAXS patterns.

Figure 12:
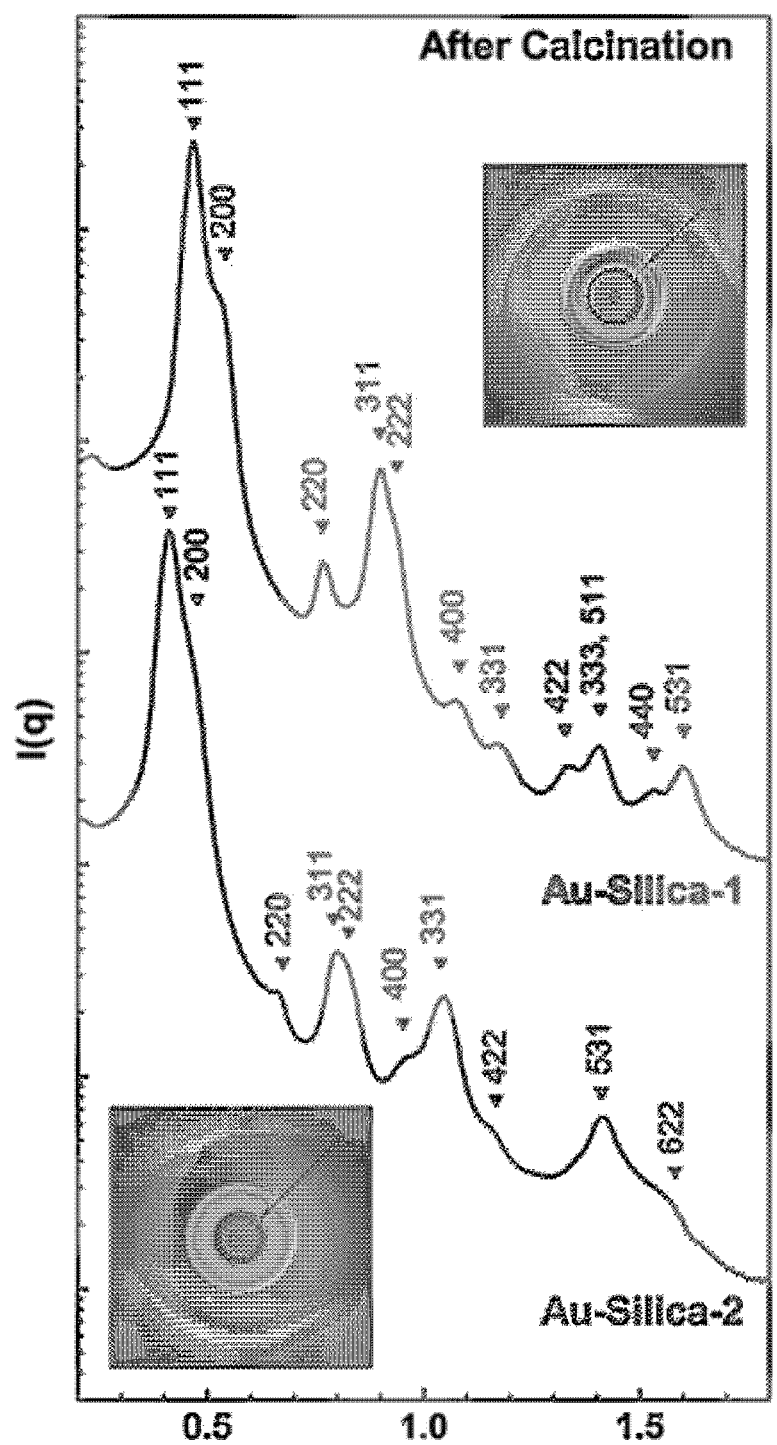

FIG. 12 is a diagram showing the small-angle X-ray scattering (SAXS) of Au-silica-1 and Au-silica-2 according to Example 1 after calcination. The inset illustrates the 2-D SAXS patterns.

Figure 13:
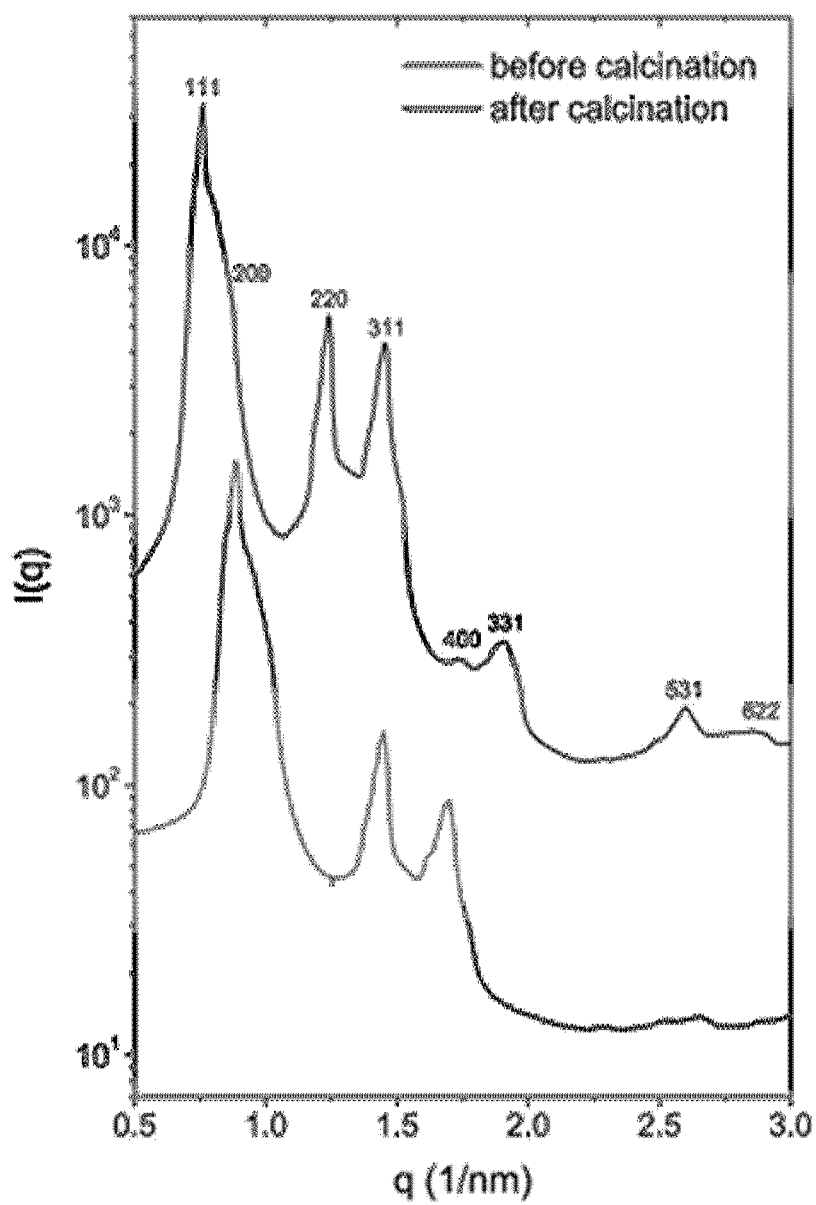

FIG. 13 is a diagram showing the small-angle X-ray scattering (SAXS) of 4-Au-silica according to Example 2 before and after calcination.

Figure 14:
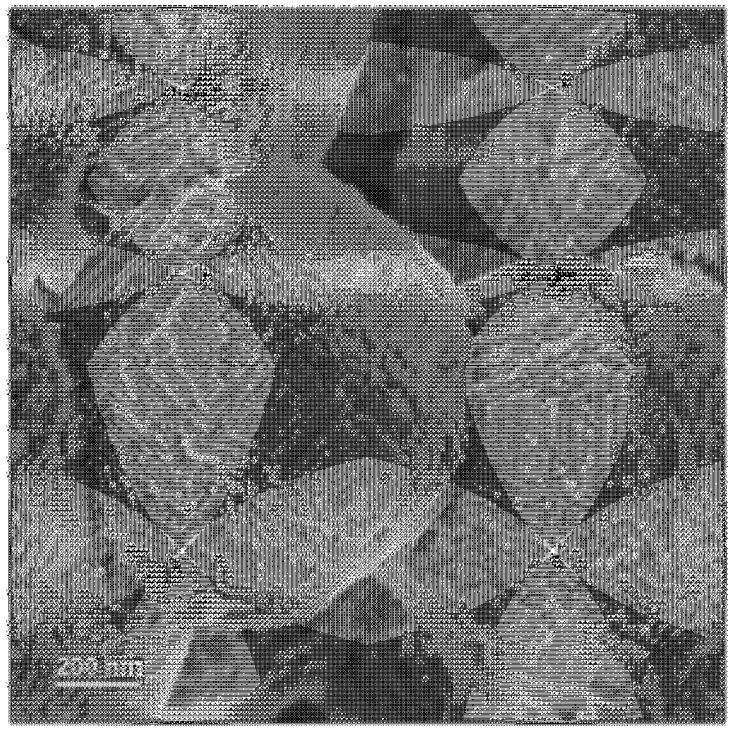

FIG. 14 is a scanning electron microscope (SEM) image of Au-silica-1 according to Example 1.

Figure 15:
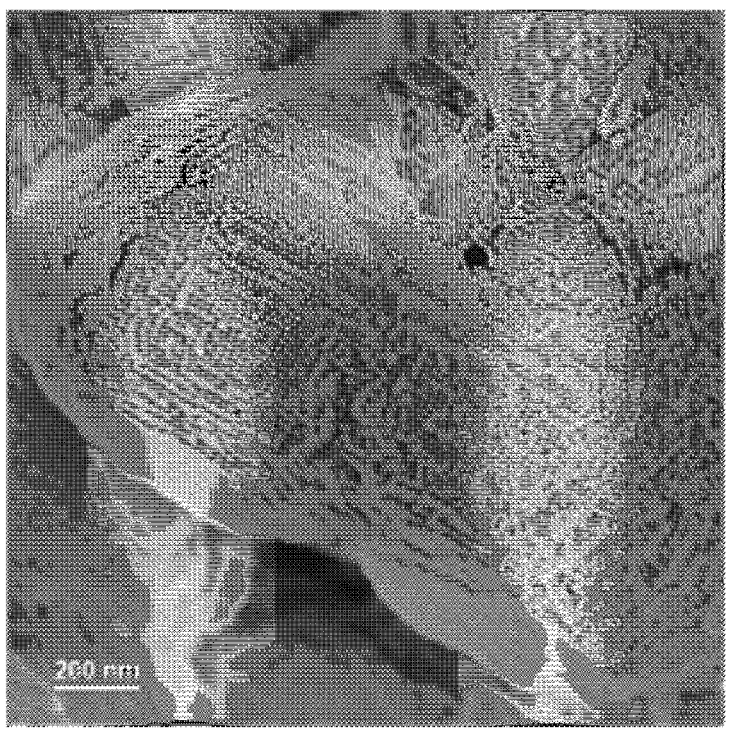

FIG. 15 is a scanning electron microscope (SEM) image of Au-silica-2 according to Example 1.

Figure 16:
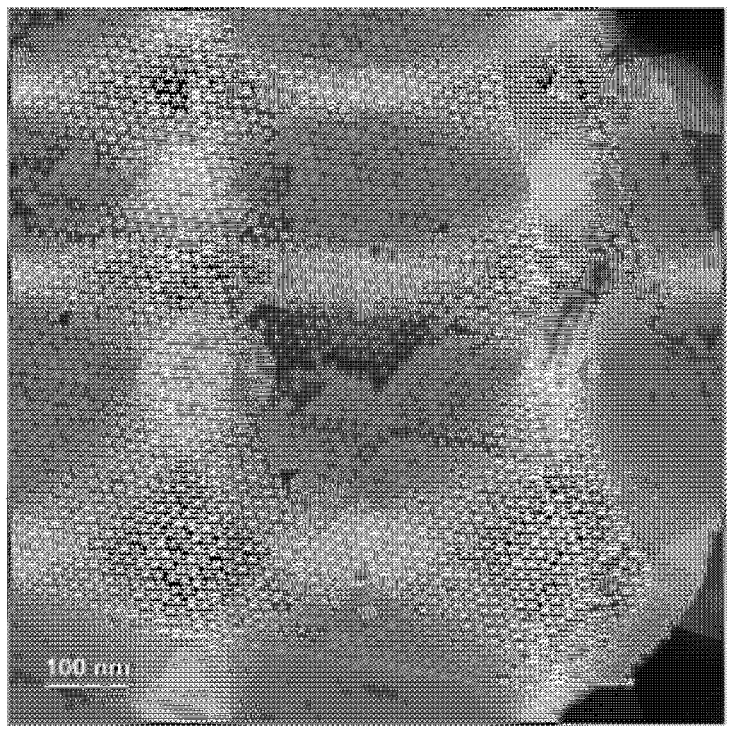

FIG. 16 is a backscattered SEM image of Au-silica-1 according to Example 1.

Figure 17:
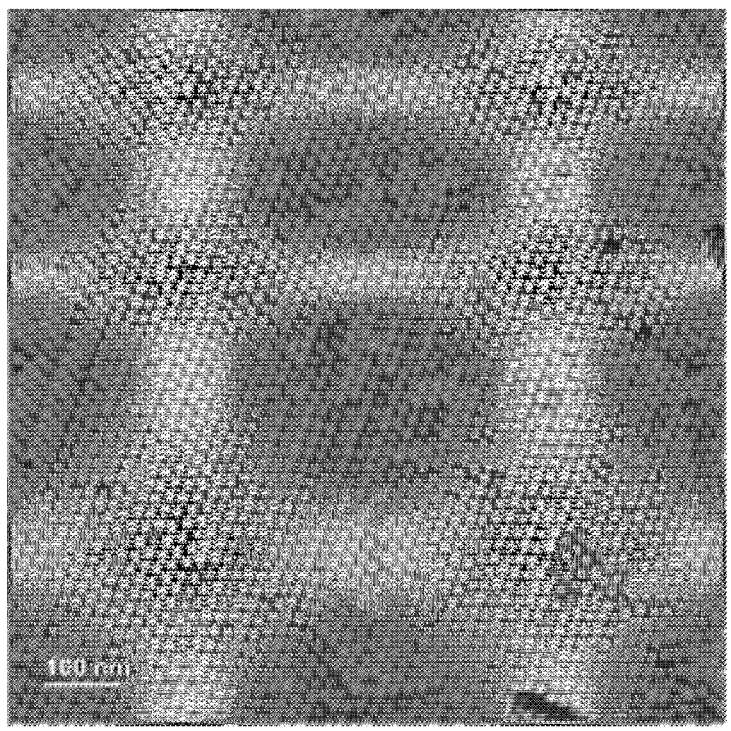

FIG. 17 is a backscattered SEM image of Au-silica-2 according to Example 1.

Figure 18:
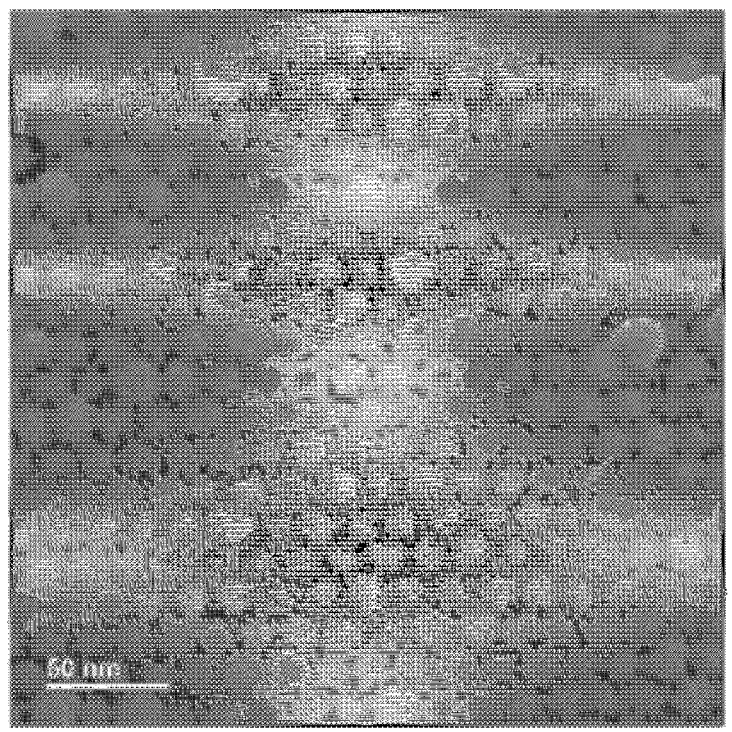

FIG. 18 is a scanning electron microscope (SEM) image of non-calcined Au-PEG-silica-2 according to Example 1.

Figure 19:
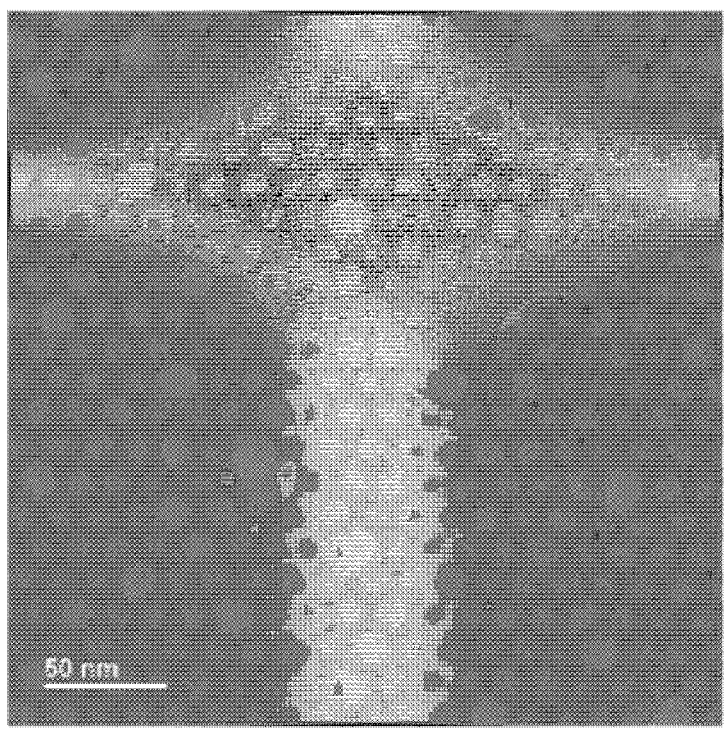

FIG. 19 is a scanning electron microscope (SEM) image of calcined Au-silica-2 according to Example 1.

Figure 20:
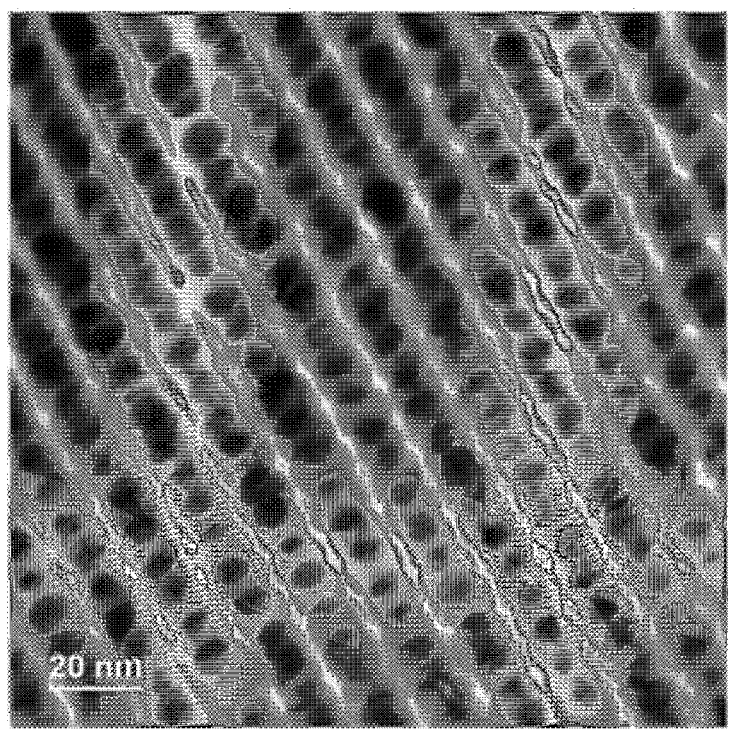

FIG. 20 is a transmission electron microscope (TEM) image of Au-silica-1 according to Example 1.

Figure 21:
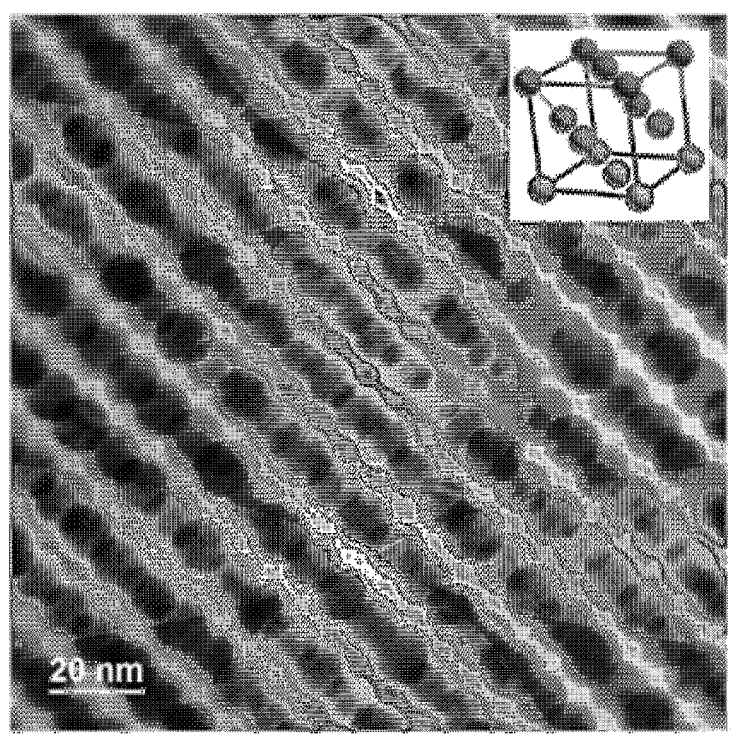

FIG. 21 is a transmission electron microscope (TEM) image of Au-silica-2 according to Example 1.

Figure 22:
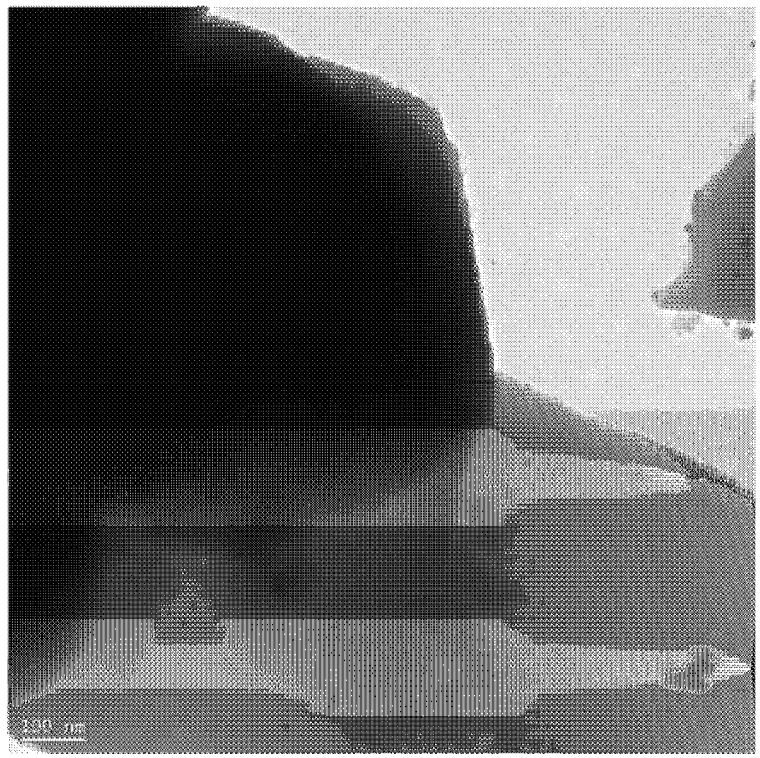
Figure 23:
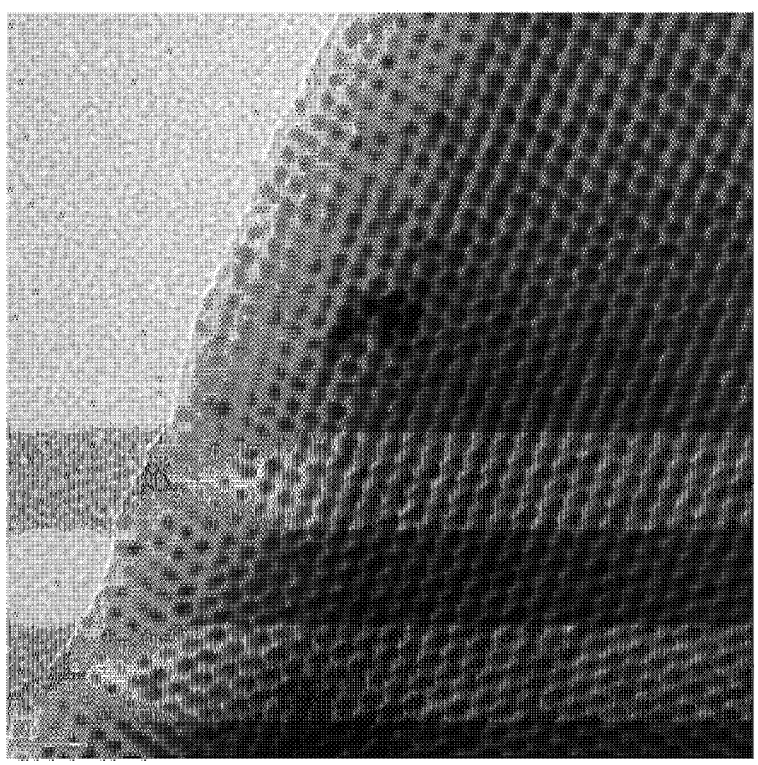

FIG. 22 and FIG. 23 are transmission electron microscope (TEM) images of 4-Au-silica according to Example 2 after calcination.

Figure 24:
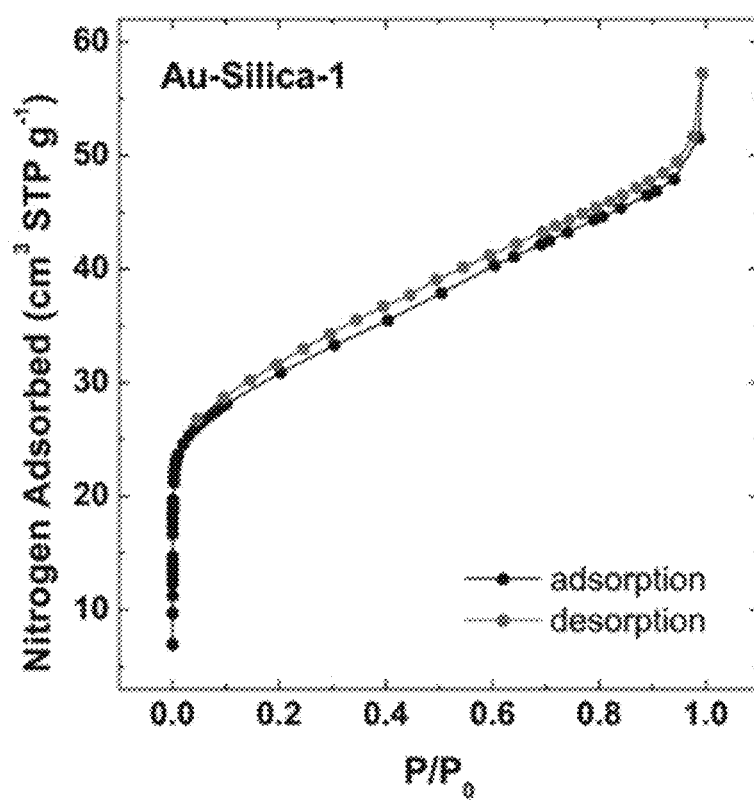

FIG. 24 is a diagram showing the nitrogen adsorption isotherm of Au-silica-1 according to Example 1.

Figure 25:
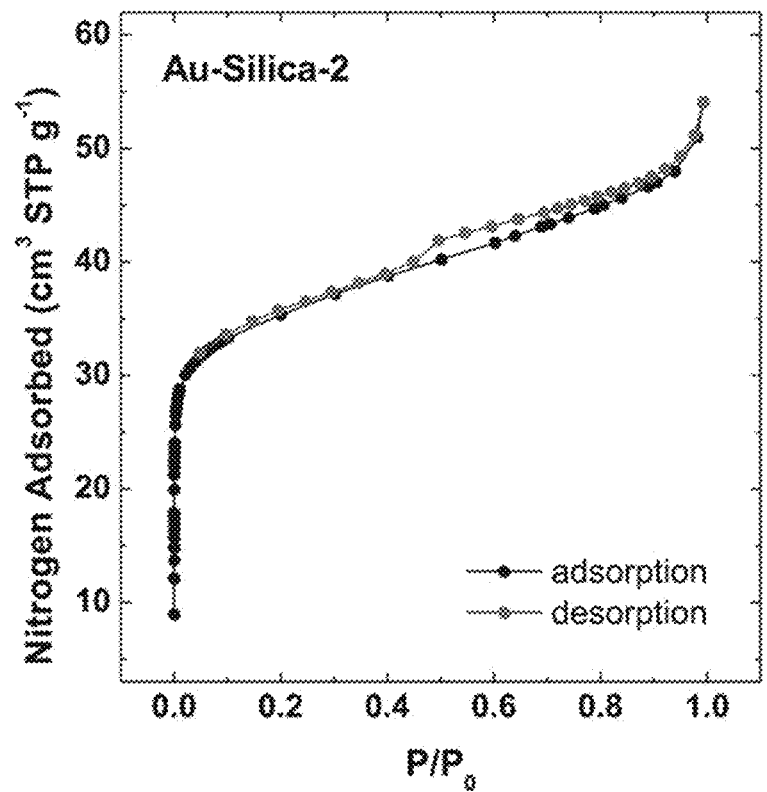

FIG. 25 is a diagram showing the nitrogen adsorption isotherm of Au-silica-2 according to Example 1.

Figure 26:
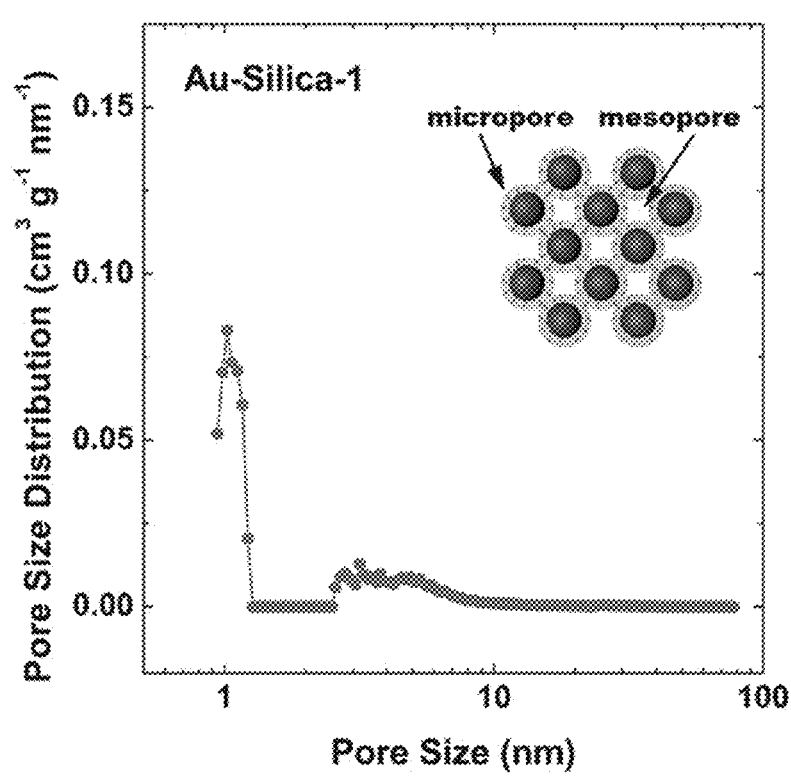

FIG. 26 is a diagram showing the pore size distribution of Au-silica-1 according to Example 1. The inset is a schematic diagram of the micropores and mesopores.

Figure 27:
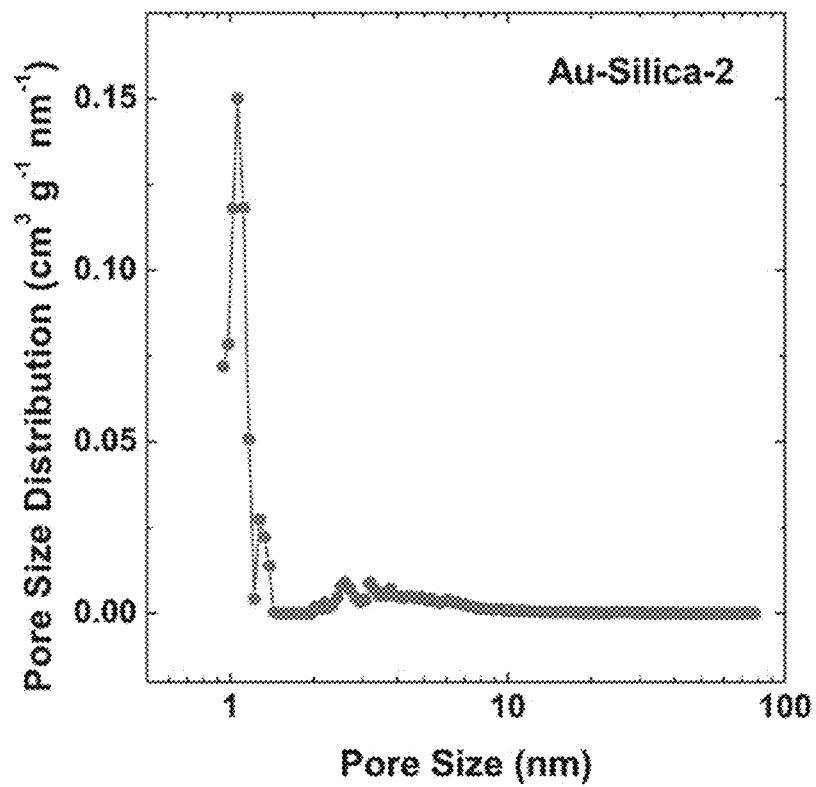

FIG. 27 is a diagram showing the pore size distribution of Au-silica-2 according to Example 1.

Figure 28:
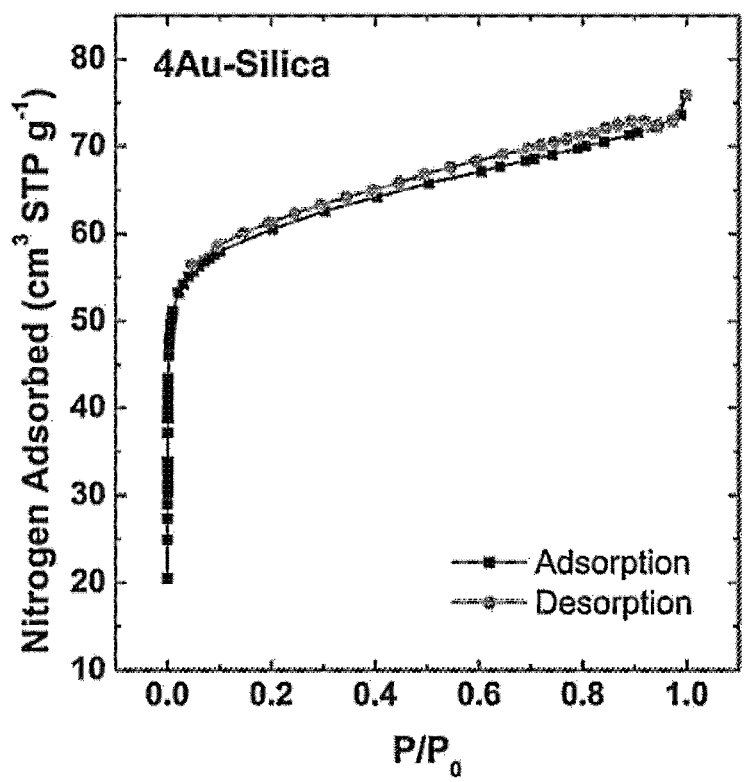

FIG. 28 is a diagram showing the nitrogen adsorption isotherm of 4-Au-silica according to Example 2.

Figure 29:
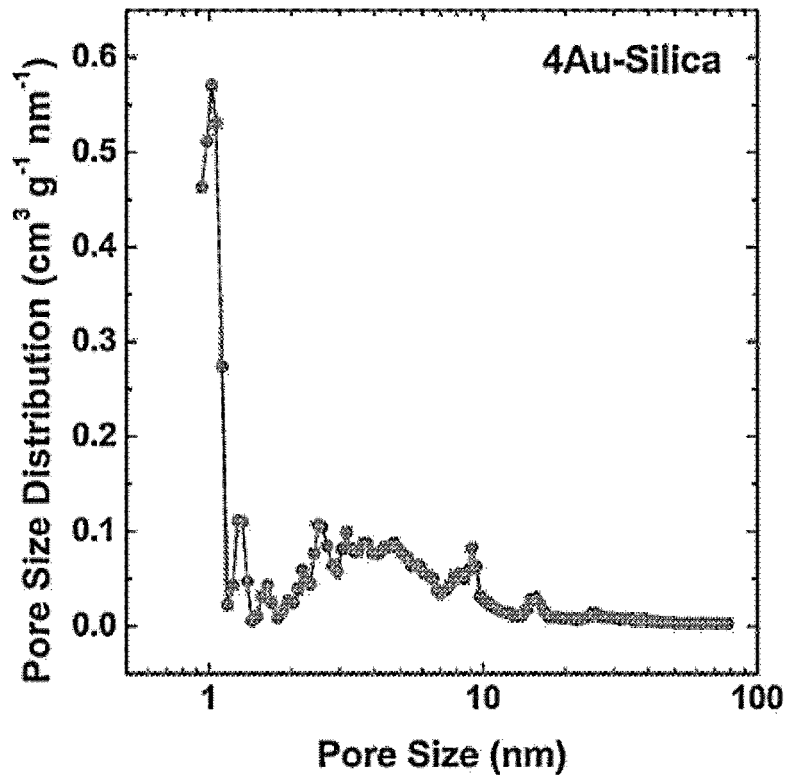

FIG. 29 is a diagram showing the pore size distribution of 4-Au-silica according to Example 2.

Figure 30:
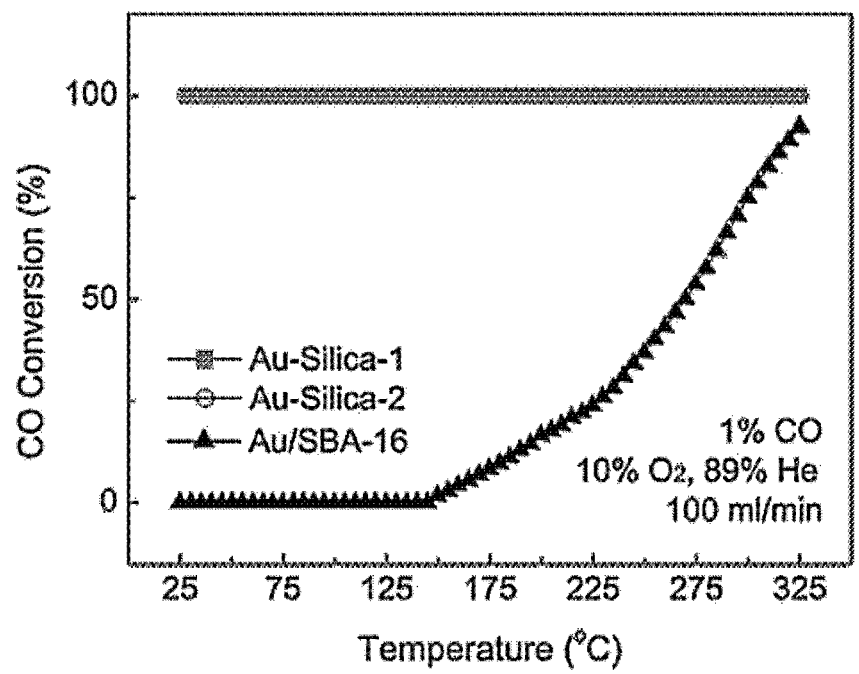

FIG. 30 is a diagram showing the CO conversion rates of Au-silica-1 and Au-silica-2 according to Example 1 and Au-SBA-16 according to Comparative Example 1 with varying temperature.

Figure 31:
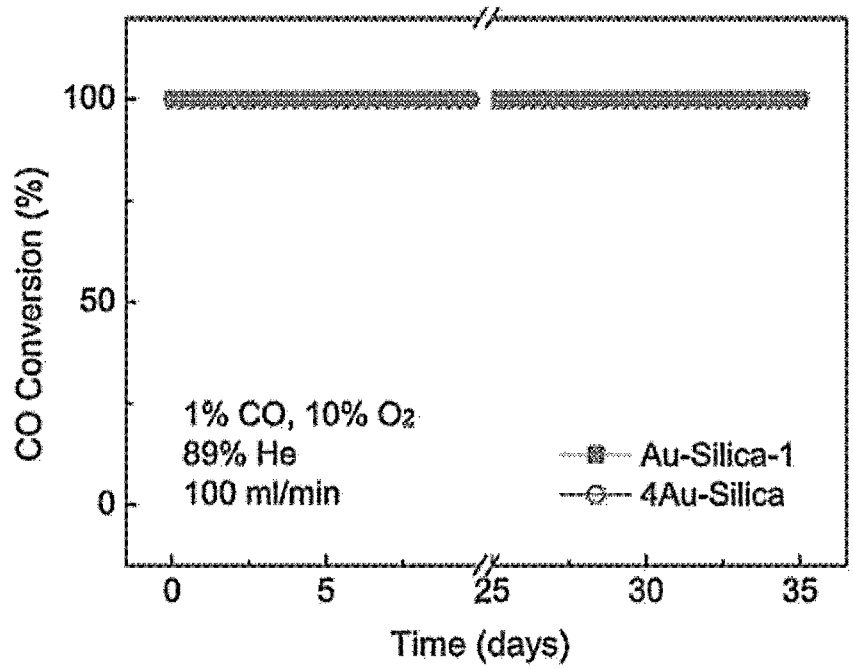

FIG. 31 is a diagram showing the CO conversion rates of Au-silica-1 according to Example 1 and 4-Au-silica according to Example 2 at room temperature with varying reaction time.

Figure 32:
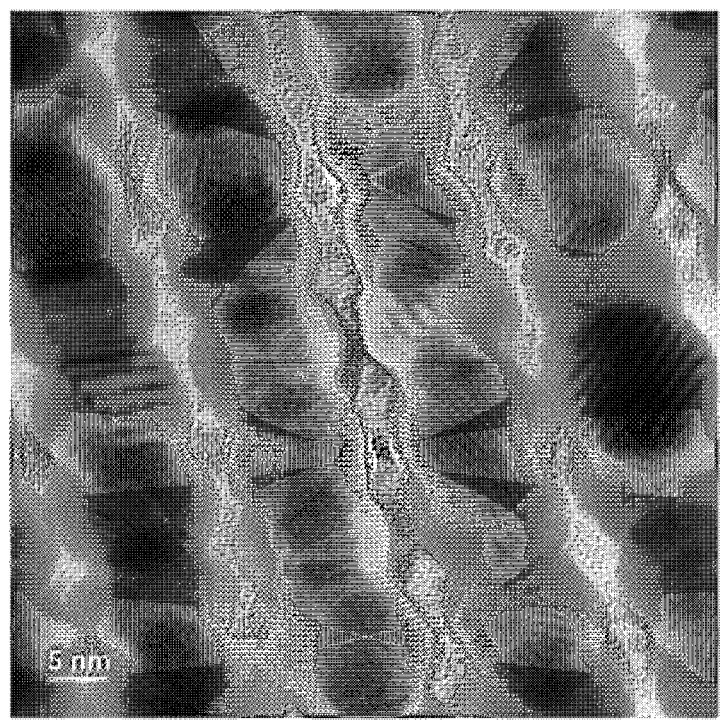

FIG. 32 is a diagram showing a transmission electron microscope (TEM) image of Au-silica-1 after catalytic reaction for 100 hours including 4 times of reactions at a high temperature of 325° C.

Figure 33:
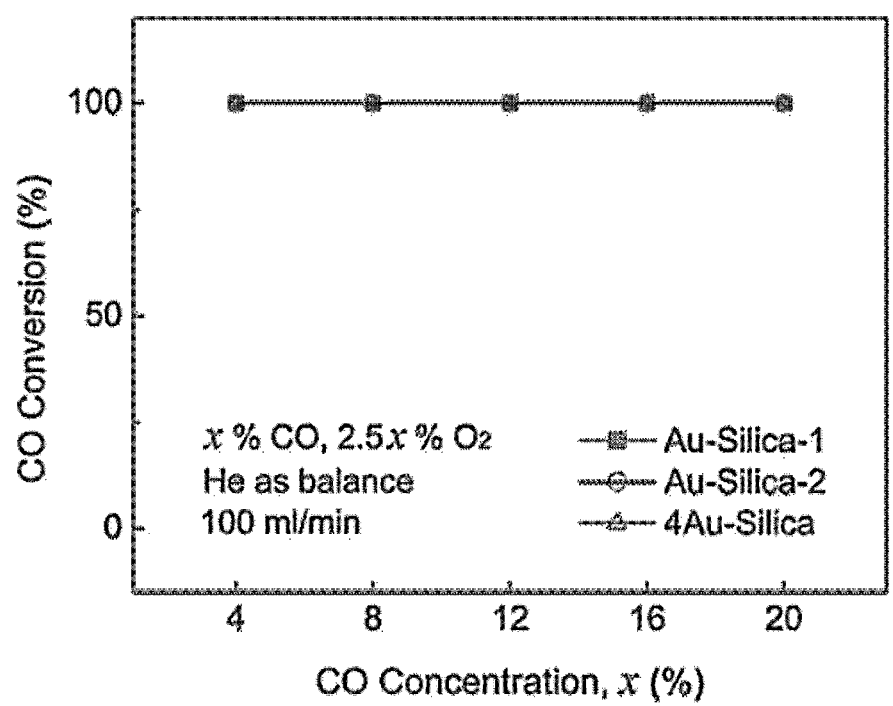

FIG. 33 is a diagram showing the CO conversion rates of Au-silica-1 and Au-silica-2 according to Example 1 and 4-Au-silica according to Example 2 with varying CO flow rate.

Figure 34:
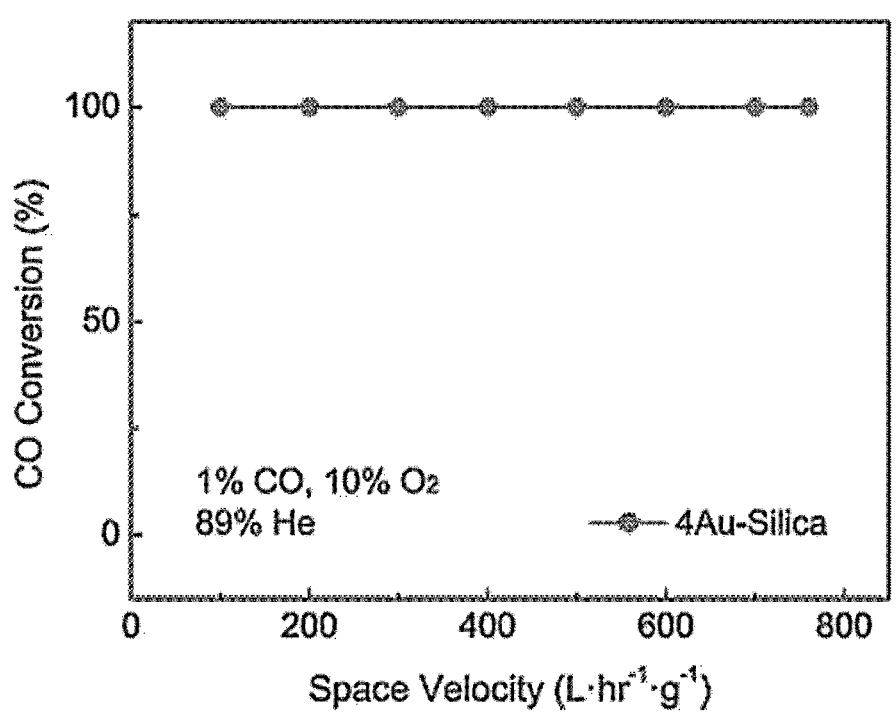

FIG. 34 is a diagram showing the CO conversion rate of 4-Au-silica according to Example 2 at a high space velocity.

Figure 35:
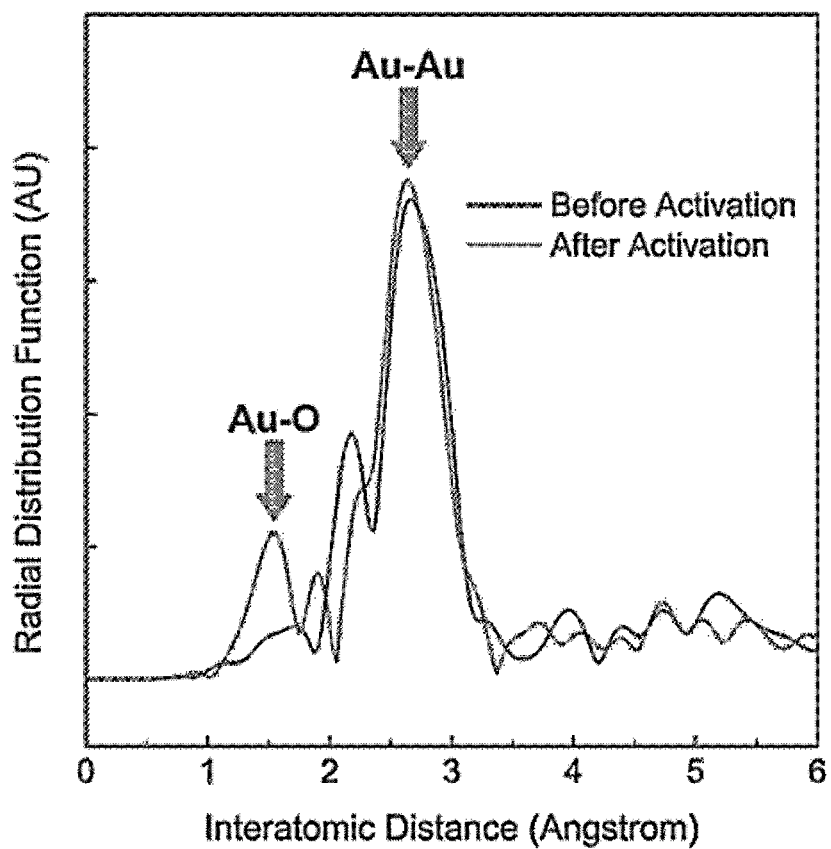

FIG. 35 is a diagram showing the radial distribution function of Au-silica-1 before and after activation.

Figure 36:
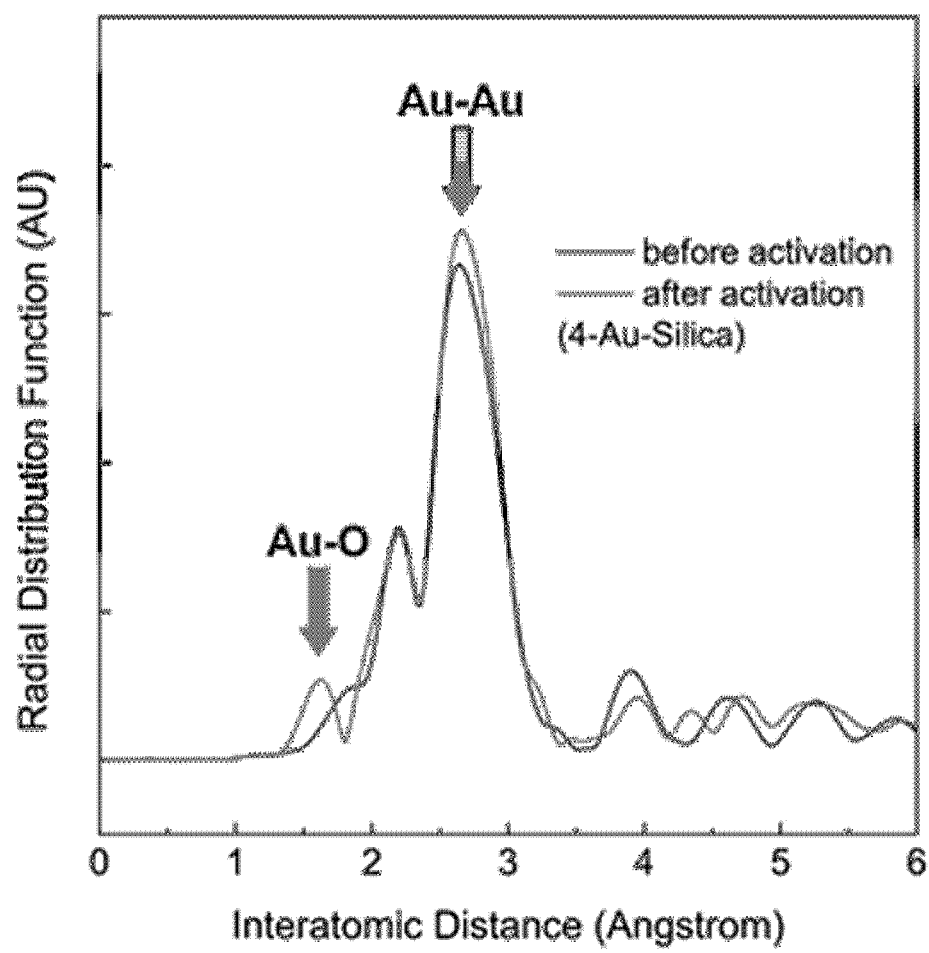

FIG. 36 is a diagram showing the radial distribution function of 4-Au-silica before and after activation.

DESCRIPTION OF EMBODIMENTS

Embodiments

Hereinafter, the present invention will be described in detail.

The present invention provides a catalyst composition comprising a gold nanoparticle superlattice (NPSL) embedded in hierarchical porous silica.

Specifically, the catalyst composition provides a highly ordered superlattice comprising a core formed by gold nanoparticles spaced at nanometer intervals and a shell made of hierarchical porous silica and which encapsulates the core, and thus can be applied to a variety of applications.

The gold nanoparticle superlattice embedded in hierarchical porous silica according to the present invention has a core-shell structure composed of a core of gold nanoparticles and hierarchical porous silica coated on the core particles. It also has a highly ordered superlattice structure having face-centered cubic (FCC) symmetry.

The hierarchical porous structure comprises micropores of 0.1 to 1.9 nm and mesopores of 2 to 10 nm. Preferably, micropores are regularly present between the mesopores in the superlattice. Accordingly, when the catalyst composition of the present invention is applied to a chemical reaction, the reactants can enter through mesopore passages, and then rapidly access and contact the surfaces of gold nanoparticles through micropore passages.

The gold nanoparticles may be prepared by a method known in the art or may be commercially purchased. For example, the gold nanoparticles may be prepared by reducing a gold precursor present in a solution to gold according to a known method (Natan et al., Anal. Chem. 67, 735 (1995)).

Preferably, the gold precursor may be any one selected from the group consisting of $HAuCl_4$, $HAuBr_4$ and combinations thereof, although not limited thereto.

The gold nanoparticles may have an average diameter of 1 to 14 nm, preferably 3 to 13 nm, although not limited thereto. In the present invention, the gold nanoparticles may be coated with a stabilizer. In this case, gold nanoparticles can exhibit high dispersion stability.

Preferably, the stabilizer is any one selected from the group consisting of sodium citrate, polyvinylpyrrolidone (PVP), polyvinyl alcohol (PVA), chitosan, arabic gum, oleylamine, and combinations thereof, more preferably, sodium citrate may be selected, although not limited thereto.

The average distance between neighboring gold nanoparticles in the superlattice may be between 15 nm and 25 nm, preferably between 18 nm and 22 nm. When gold nanoparticles are spaced at nanometer intervals, the intrinsic properties of the nanoparticles are enhanced due to the mutual influence of the particles, or the nanoparticles are made to exhibit unique characteristics that are different from those of a single nanoparticle. However, it is not technically easy to arrange several gold nanoparticles very close to each other at intervals, because the nearby gold nanoparticles agglomerate to form aggregation. Thus, the technique of arranging one or more gold nanoparticles very close to each other is very difficult, although it is very important.

The present invention also provides a method for manufacturing a catalyst composition, comprising the steps of:
preparing a dispersion of gold nanoparticles functionalized with thiolated poly(ethylene glycol);
adding a silica precursor to the dispersion of gold nanoparticles and stirring the dispersion to obtain a precipitate; and
calcining the precipitate in an inert atmosphere to prepare a gold nanoparticle superlattice embedded in hierarchical porous silica.

The gold nanoparticle superlattice embedded in hierarchical porous silica is highly ordered because the porous silica is condensed and self-assembled using the gold nanoparticles as seeds.

Step (1) is a step of preparing a dispersion of gold nanoparticles functionalized with thiolated poly(ethylene glycol).

Specifically, a dispersion of gold nanoparticles coated with stabilizers such as citrate is prepared, and thiolated poly(ethylene glycol) is added thereto. The mixture is then stirred to introduce a thiolated poly(ethylene glycol) group to the surfaces of gold nanoparticles.

The gold nanoparticles may be prepared by a method known in the art or may be commercially purchased. For example, the gold nanoparticles may be prepared by reducing a gold precursor present in a solution to gold according to a known method (Natan et al., Anal. Chem. 67, 735 (1995)).

Any solvent capable of dissolving the gold precursor without affecting the reaction can be used as the solvent. Preferably, water, alcohol, toluene, oleic acid, oleamine, dimethylformamide, more preferably, water may be used, although not limited thereto.

The thiolated poly(ethylene glycol) may have an average molecular weight of 0.1 to 5 kDa, although not limited thereto. By adjusting the molecular weight, i.e., the chain length of the thiolated poly(ethylene glycol), it is possible to adjust the size of the hierarchical pore structure and the interval between the gold nanoparticles encapsulated with porous silica shells.

The gold nanoparticles functionalized with thiolated poly(ethylene glycol) may have an average hydrodynamic diameter of 20 to 40 nm, although not limited thereto. The diameter is larger than the hydrodynamic diameter of gold nanoparticles (12 to 18 nm). This means that the gold nanoparticles have been well functionalized with thiolated poly(ethylene glycol). The average hydrodynamic diameter of gold nanoparticles functionalized with thiolated poly(ethylene glycol) can be adjusted by adjusting the molecular weight, i.e., the chain length of poly(ethylene glycol).

The average number density of the thiolated poly(ethylene glycol) functionalized on the surfaces of the gold nanoparticles may be 2 to 5 $nm^{-2}$, although not limited thereto. The porosity of the porous silica structure can be adjusted by adjusting the average number density of poly(ethylene glycol) on the surfaces of the gold nanoparticles.

Step (2) is a step of adding a silica precursor to the dispersion of gold nanoparticles functionalized with thiolated poly(ethylene glycol) and stirring the dispersion to obtain a precipitate.

Specifically, the dispersion of gold nanoparticles functionalized with thiolated poly(ethylene glycol) is suspended in an aqueous acid solution, and then silica is added thereto, followed by stirring for 10 to 20 minutes to obtain, as a precipitate, a superlattice of gold nanoparticles functionalized with poly(ethylene glycol) embedded in porous silica.

The silica precursor may be tetraethyl orthosilicate, tetramethyl orthosilicate, tetrapropyl orthosilicate, tetrabutyl orthosilicate, tetrachlorosilane, sodium silicate, etc., preferably, tetraethyl orthosilicate.

Step (3) is a step of calcining the precipitate in an inert atmosphere to prepare a gold nanoparticle superlattice embedded in hierarchical porous silica Specifically, the superlattice of gold nanoparticles functionalized with poly(ethylene glycol) embedded in porous silica as a precipitate is washed with water, dried, and then calcined in an inert atmosphere to remove poly(ethylene glycol) and prepare a gold nanoparticle superlattice embedded in hierarchical porous silica.

The calcination temperature is not limited as long as it allows thermal decomposition of poly(ethylene glycol). However, according to one embodiment, it is preferably 400 to 500° C.

The inert atmosphere may include helium, argon, or nitrogen gas. Preferably, it is helium gas.

The present invention provides a catalyst composition providing a highly ordered superlattice comprising a core formed by gold nanoparticles spaced at nanometer intervals and a shell made of hierarchical porous silica and which encapsulates the core, and thus which can be applied to a variety of applications.

Also, the present invention provides a method for removing carbon monoxide (CO), comprising the step of oxidizing carbon monoxide (CO) using the catalyst composition.

Also, the present invention provides a carbon monoxide (CO) remover comprising the catalyst composition. The carbon monoxide (CO) remover according to the present invention comprises hierarchical porous silica encapsulating gold nanoparticles having an average diameter of 1 to 14 nm and thus exhibits excellent catalytic activity for CO oxidation. Thus, it was first shown to have a CO conversion rate of 100% at room temperature.

EXAMPLES

Hereinafter, preferable examples will be provided in order to facilitate understanding of the present invention. However, the examples are provided to facilitate understanding of the present invention, and the content of the present invention is not limited to the examples.

Example 1: Preparation of a Superlattice of Gold Nanoparticles of the Average Diameter of 12 nm Embedded in Hierarchical Porous Silica 1-1. Preparation of Poly(Ethylene Glycol)(PEG)-Functionalized Gold Nanoparticles First, while vigorously refluxing 500 mL of 1 mM $HAuCl_4 \cdot 3H_2O$ aqueous solution with heating in a 1 L round-bottomed flask equipped with a condenser, 50 mL of 38.8 mM trisodium citrate aqueous solution was rapidly added to the flask to induce a color change from yellow to dark red. The mixed solution was heated for 10 minutes, and then the heat source was removed, followed by further stirring for 15 minutes to prepare a citrate-stabilized gold nanoparticle colloidal solution.

Then, 1 g of thiolated poly(ethylene glycol)(SH-PEG) having a molecular weight of 1 or 2 kDa was added to the thus-prepared, citrate-stabilized gold nanoparticle colloidal solution. The mixture was then stirred overnight to prepare gold nanoparticles functionalized with SH-PEG, Au-PEG-1 (SH-PEG with a molecular weight of 1 kDa) or Au-PEG-2 (SH-PEG with a molecular weight of 2 kDa). The unbound polymers were removed by three successive centrifugations (75,000 g for 1 hour each). The centrifuged PEG-functionalized gold nanoparticles were lyophilized and redispersed in water at the desired concentration.

1-2. Manufacture of a Gold Nanoparticle Superlattice Embedded in Hierarchical Porous Silica The PEG-functionalized gold nanoparticles prepared in Example 1-1, Au-PEG-1 (0.21 g) or Au-PEG-2 (0.17 g), were uniformly dispersed in 1 mL of 1.6 M HCl aqueous solution. The resultant dispersion was added with 0.17 g of tetraethyl orthosilicate (TEOS). The mixture was stirred for 15 minutes and maintained at room temperature without stirring for 40 hours to obtain, as black precipitates, PEG-functionalized gold nanoparticles embedded in hierarchical porous silica, Au-PEG-silica-1 or Au-PEG-silica-2. Then, the thus-prepared black precipitates were washed with water and dried, and then calcined at 450° C. under helium to remove PEG molecules and obtain a gold nanoparticle superlattice embedded in hierarchical porous silica, Au-silica-1 or Au-silica-2.

Figure 1:
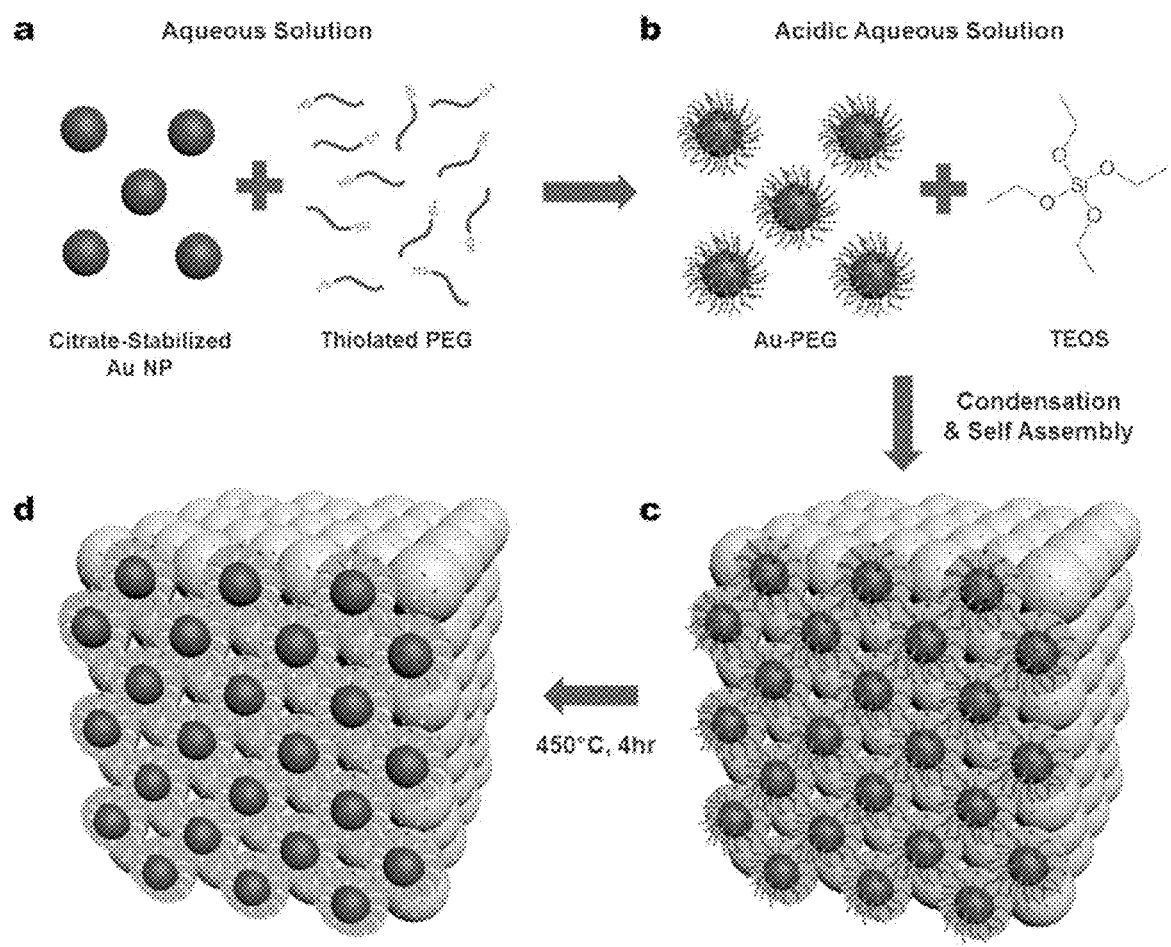
FIG. 1 is a diagram showing the process for preparing a gold nanoparticle superlattices embedded in hierarchical porous silica according to Example 1 of the present invention.

FIG. 1 shows the process for preparing the gold nanoparticle superlattices embedded in hierarchical porous silica according to Example 1.

Example 2: Preparation of a Superlattice of Gold Nanoparticles of the Average Diameter of 4 nm Embedded in Hierarchical Porous Silica 2-1. Preparation of Poly(Ethylene Glycol)(PEG)-Functionalized Gold Nanoparticles 4 nm gold nanoparticles stabilized by coating with oleylamine were synthesized by the following procedure according to a known procedure (Lee et al., Chem. Mater. 22, 755 (2010)): A solution composed of 60 ml of tetralin, 60 ml of oleylamine and 0.6 g of $HAuCl_4 \cdot 3H_2O$ was stirred at room temperature for 10 minutes. 6 mmol of TBAB, 6 ml of tetralin and 6 ml of oleylamine were sonicated, mixed, and then rapidly added to the solution. The solution was further stirred at room temperature for 1 hour, added with ethanol, followed by centrifugation to precipitate gold nanoparticles. The resultant was redispersed in hexane and added with ethanol, followed by centrifugation. The 4 nm gold nanoparticles as prepared were dispersed in 100 ml of toluene.

The surfaces of the 4 nm gold nanoparticles were functionalized with 1 kDa thiolated PEG by the following method: Gold nanoparticles dispersed in 100 ml of toluene was further diluted by adding 100 ml of tetrahydrofuran, and 1 g of 1 kDa thiolated PEG was added thereto. The mixture was stirred and added with hexane, followed by centrifugation to precipitate gold nanoparticles. The collected 4-Au-PEG was lyophilized and dispersed in water for use in the next step.

2-2. Manufacture of a Gold Nanoparticle Superlattice Embedded in Hierarchical Porous Silica A superlattice of gold nanoparticles of the average diameter of 4 nm embedded in porous silica was prepared by the same method as that of Example 1-2.

Comparative Example 1: Preparation of Gold Nanoparticles of the Average Diameter of 12 nm Embedded in SBA-16

12 nm gold nanoparticles embedded in SBA-16 were synthesized. SBA-16 is a mesoporous silica in which spherical mesopores are arranged in bcc symmetry. Gold nanoparticles (11.6 nm±1.6 nm) encapsulated with oleylamine were synthesized by the following procedure according to a known method (Hiramatsu, H. et al., Chem. Mater. 16, 2509 (2004)): 0.01 g of the synthesized gold nanoparticles were dispersed in 1 ml of chloroform and mixed with 15 g of 0.67% by weight Pluronic F127 aqueous solution. The mixture was sonicated for 30 minutes to allow the chloroform in which gold nanoparticles were dispersed to be inserted into the hydrophobic cores in the spherical micelles of F127. The chloroform in the emulsion was evaporated in vacuo, and the resultant solution was lyophilized. 1 g of the dried mixture was suspended homogeneously in 30 ml of 1.6 M HCl aqueous solution and 2.1 g of TEOS was added thereto with stirring. The mixture was stirred for 15 minutes and then left at 38° C. for 40 hours without stirring. The pink solid precipitate was washed with water and dried. The solid product was calcined under helium at 500° C. to remove F127. The ICP-MS measurement result showed that the calcined product contained 0.8% by weight of gold.

Structural Analysis and Performance Evaluation

Test Example 1: Structural Analysis of a Gold Nanoparticle Superlattice Embedded in Hierarchical Porous Silica 1-1. Structural Analysis of Citrate-Stabilized Gold Nanoparticles The structure of the citrate-stabilized gold nanoparticles according to Example 1 was analyzed using a transmission electron microscope (TEM). Transmission electron microscope (TEM) measurements were performed using 200 kV FE-TEM (JEM-2200FS, JEOL Ltd.) at the KBSI Jeonju center.

Figure 2:
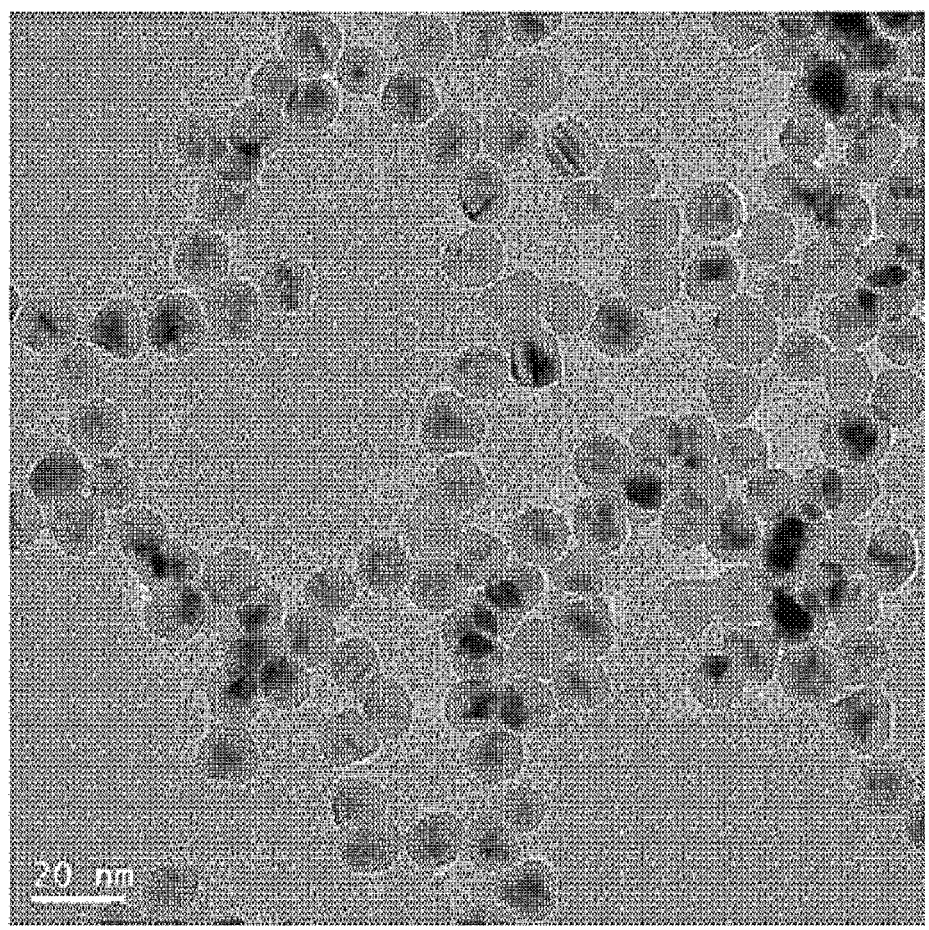
FIG. 2 is a diagram showing a transmission electron microscope (TEM) image of the citrate-stabilized gold nanoparticles prepared in Example 1-1.
Figure 3:
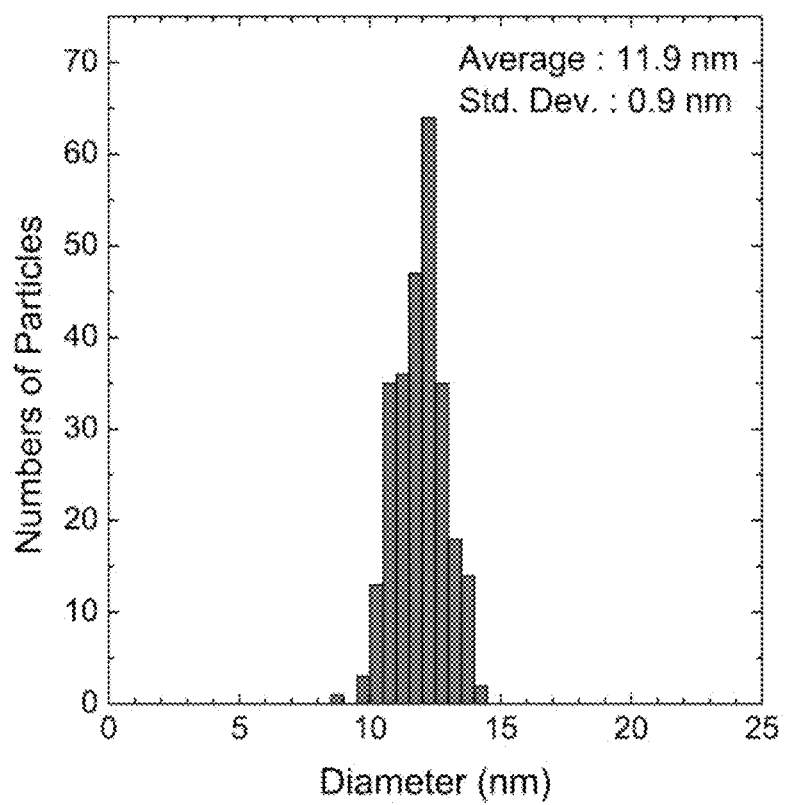
FIG. 3 is a diagram showing the size distribution of the gold nanoparticles prepared in Example 1-1.
Figure 4:
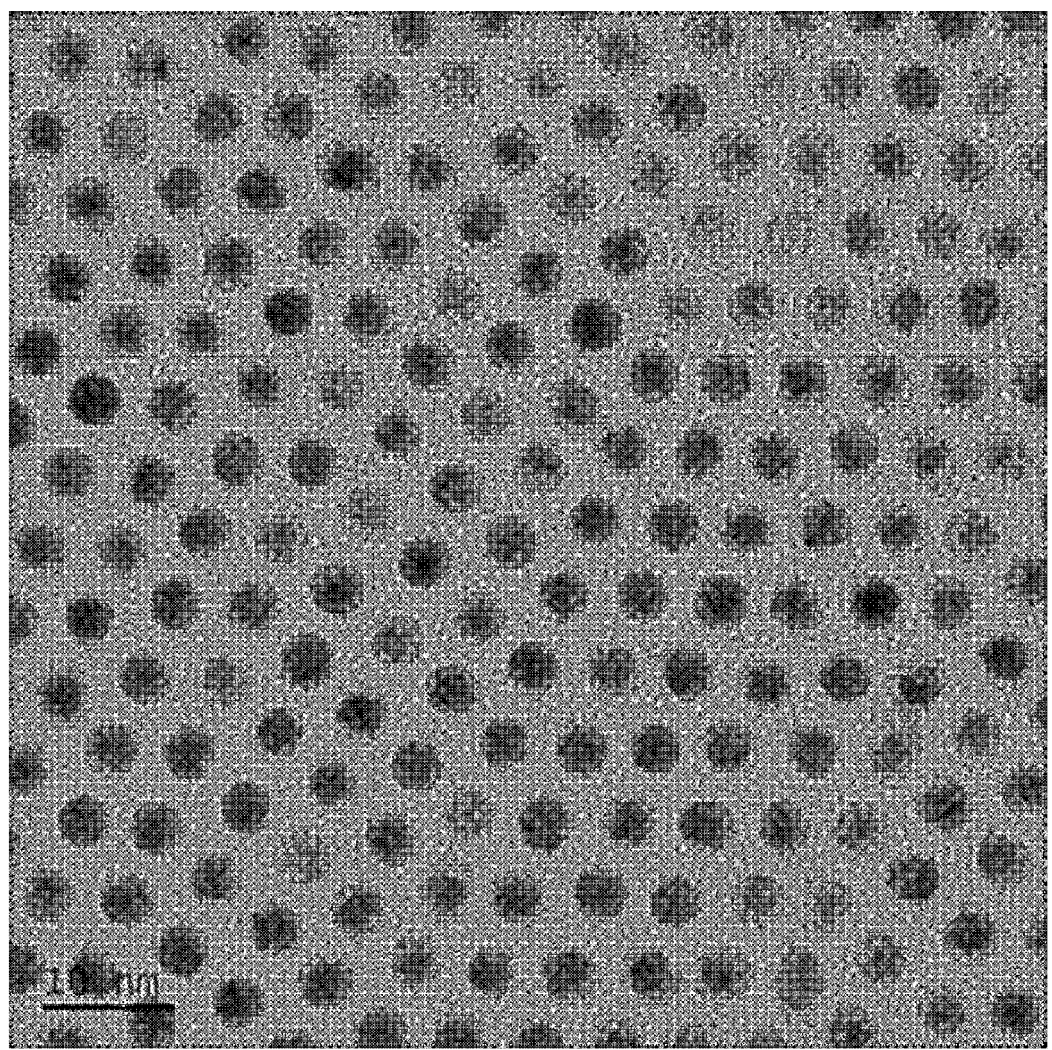
FIG. 4 is a transmission electron microscope (TEM) image of the 4 nm gold nanoparticles prepared in Example 2-1.

A transmission electron microscope (TEM) image of the citrate-stabilized gold nanoparticles prepared in Example 1-1 is shown in FIG. 2. As shown in FIG. 2, the gold nanoparticles exhibited a spherical morphology. Also, as shown in FIG. 3, the gold nanoparticles had a size distribution of 9 to 14 nm and the average size of 11.9 nm. FIG. 4 is a TEM image showing the size (diameter of 4.1 nm±0.16 nm) and morphology of the gold nanoparticles prepared in Example 2-1.

1-2. Structural Analysis of PEG-Functionalized Gold Nanoparticles

The structures of the gold nanoparticles functionalized with thiolated poly(ethylene glycol) (SH-PEG) having a molecular weight of 1 or 2 kDa prepared in Example 1-1, Au-PEG-1 and Au-PEG-2, were analyzed. A Brookhaven 90 Plus Particle Analyzer was used for dynamic light scattering measurement. Small-angle neutron scattering (SANS) measurements were performed using 40 m SANS at HANARO of the Korea Atomic Energy Research Institute. Transmission electron microscope (TEM) measurements were performed using 300 kV FE-TEM (Tecnai G2 F30, FEI). Thermogravimetric analysis was performed using Setaram TGA 92-18.

Figure 5:
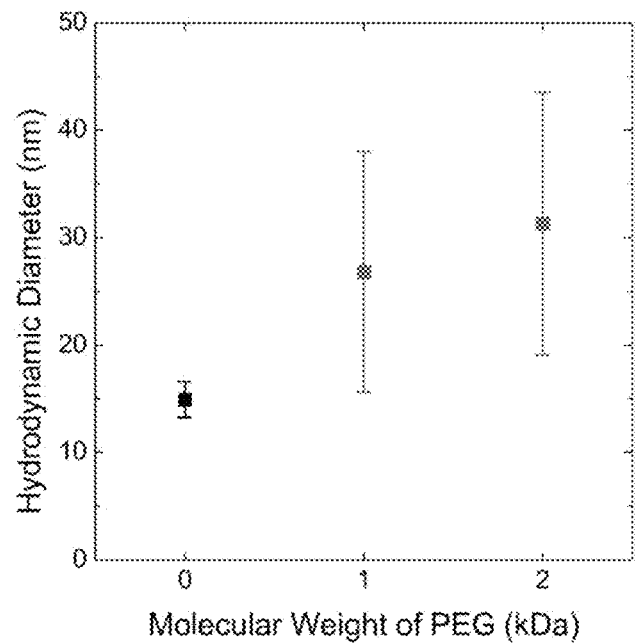
FIG. 5 is a diagram showing the dynamic light scattering measurement results of Au-PEG-1 (gold nanoparticles functionalized by SH-PEG with a molecular weight of 1 kDa)

FIG. 5 shows the dynamic light scattering measurement results of Au-PEG-1 and Au-PEG-2 prepared in Example 1-1, FIGS. 6A and 6B show the small-angle neutron scattering (SANS) measurement results and the fitting results thereof, FIG. 7 and FIG. 8 show transmission electron microscope (TEM) images, and FIG. 9 shows the thermogravimetric analysis results.

As shown in FIG. 5, the dynamic light scattering measurement results showed that the gold nanoparticles functionalized with thiolated PEGs each having molecular weights of 1 kDa and 2 kDa, Au-PEG-1 and Au-PEG-2, had hydrodynamic diameters of 27 nm and 31 nm, respectively. The diameters are larger than the hydrodynamic diameter (15 nm) of the synthesized gold nanoparticles, indicating that the gold nanoparticles were well functionalized with thiolated PEG.

As shown in FIGS. 6A and 6B, the small-angle neutron scattering (SANS) intensity patterns of Au-PEG-1 and Au-PEG-2 were shifted to a lower q region as the molecular weight of thiolated PEG increased from 1 kDa to 2 kDa. These results show that the gold nanoparticles functionalized with thiolated PEG are very monodisperse and that the longer the PEG chain is, the thicker the PEG shell is. The SANS intensities were analyzed using a spherical core-shell form factor. The neutron scattering length intensities of $D_2O$, gold nanoparticles and PEG were found to be $6.39 \times 10^{10}$ cm$^{-2}$, $4.66 \times 10^{10}$ cm$^{-2}$ and $2.66 \times 10^{10}$ cm$^{-2}$, respectively. The neutron scattering length intensity in the shell may vary depending on the PEG concentration and the degree of hydration. Given this matter, the PEG shell region can be divided into three layer regions. From the core-shell form factor analysis, it was found that the shell thicknesses of Au-PEG-1 and Au-PEG-2 based on 13 nm gold nanoparticles were 4.5 nm and 7.0 nm, respectively. The average number density of PEG ligands on the gold nanoparticle surfaces was found to be 3.7 nm$^{-2}$ and 3.0 nm$^{-2}$ for Au-PEG-1 and Au-PEG-2, respectively.

The results of SANS analysis of Au-PEG-1 and Au-PEG-2 according to Example 1 are shown in Table 1.

TABLE 1

| Factor | Au-PEG-1 | Au-PEG-2 |
| --- | --- | --- |
| Core radius (Rcore, nm) | 6.5 | 6.5 |
| Thickness of shell 1 (Tshell 1, nm) | 2.4 | 1.6 |
| Thickness of shell 2 (Tshell 2, nm) | 1.2 | 2.0 |
| Thickness of shell 3 (Tshell 3, nm) | 0.9 | 3.4 |
| Volume fraction of PEG in shell 1 | 0.98 | 0.94 |
| Volume fraction of PEG in shell 2 | 0.51 | 0.75 |
| Volume fraction of PEG in shell 3 | 0.40 | 0.37 |
| Total thickness of shell (nm) | 4.5 | 7.0 |

As shown in FIG. 7 and FIG. 8, the transmission electron microscope (TEM) images showed that the gold nanoparticles were stably separated from one another and that the distance between neighboring gold nanoparticles was 17.0±2.3 nm and 19.2±2.1 nm for Au-PEG-1 and Au-PEG-2, respectively.

As shown in FIG. 9, the thermogravimetric analysis of Au-PEG-1 and Au-PEG-2 showed that all the PEGs were thermally decomposed at 400° C., leaving only gold nanoparticles. Also, from the weight fractions of gold and PEG, it was found that the average number density of PEG ligands on gold nanoparticle surfaces was 3.7 nm$^{-2}$ and 2.6 nm$^{-2}$ for Au-PEG-1 and Au-PEG-2, respectively. The results are in good agreement with the SANS results.

As shown in FIG. 10, the thermogravimetric analysis results of 4-Au-PEG prepared in Example 2-1 showed that the amount of gold was 54% by weight, and from the mass ratio of gold to PEG, the average number density of PEG molecules per unit surface area of gold was found to be 6.9 nm$^{-2}$.

Table 2 shows the thermogravimetric analysis results of Au-PEG-1 and Au-PEG-2 prepared in Example 1-1 and 4-Au-PEG prepared in Example 2-1.

TABLE 2

| Factor | Au-PEG-1 | Au-PEG-2 | 4-Au-PEG |
| --- | --- | --- | --- |
| Weight fraction of gold | 0.86 | 0.82 | 0.54 |
| Weight fraction of PEG | 0.14 | 0.18 | 0.46 |
| Number of PEG per gold nanoparticle | 1670 | 1160 | 360 |
| Area number density of PEG on gold surface (nm$^{-2}$) | 3.7 | 2.6 | 6.9 |

1-3. Structural Analysis of a Gold Nanoparticle Superlattice Embedded in Hierarchical Porous Silica The morphologies and sizes of the gold nanoparticle superlattices embedded in hierarchical porous silica according to Example 1 and Example 2 were analyzed. The small-angle X-ray scattering (SAXS) and extended X-ray absorption fine structure (EXAFS) measurements were performed using 4C and 10C beamlines of Pohang Accelerator (PLS-II). Field emission scanning electron microscopy (FE-SEM) measurements were performed using Magellan 400 (FEI) at the KAIST Analysis Center and S-5500 (Hitachi) at the KBSI Jeonju Center. Transmission electron microscope (TEM) measurements were also performed using 300 kV FE-TEM (Tecnai G2 F30, FEI).

FIG. 11 shows the small-angle X-ray scattering (SAXS) of Au-PEG-silica-1 and Au-PEG-silica-2 according to Example 1 before calcination, FIG. 12 shows the small-angle X-ray scattering (SAXS) of Au-PEG-silica-1 and Au-PEG-silica-2 after calcination, FIG. 13 shows the small-angle X-ray scattering (SAXS) of 4-Au-silica according to Example 2 before and after calcination, FIG. 14 and FIG. 15 show scanning electron microscope (SEM) images of Au-silica-1 and Au-silica-2 according to Example 1, FIG. 16 and FIG. 17 show backscattered SEM images of Au-silica-1 and Au-silica-2, FIG. 18 and FIG. 19 show scanning electron microscope (SEM) images of Au-PEG-silica-2 and Au-silica-2, and FIG. 20 and FIG. 21 show transmission electron microscope (TEM) images of Au-silica-1 and Au-silica-2.

As shown in FIG. 11, the small-angle X-ray scattering (SAXS) intensities of Au-PEG-silica-1 and Au-PEG-silica-2 showed distinct reflections including high order peaks indexed by face-centered cubic (FCC) symmetry. These results indicate that highly ordered superlattices with FCC symmetry are formed in both of the samples before calcination. In addition, the distances between the nearest neighboring gold nanoparticles of Au-PEG-silica-1 and Au-PEG-silica-2 were found to be 19.1 nm and 21.4 nm, respectively. These results show that the interparticle distance can be adjusted by changing the chain length of the thiolated PEG.

As shown in FIG. 12, the small-angle X-ray scattering (SAXS) intensities of Au-silica-1 and Au-silica-2 showed distinct reflections which are substantially the same as those of the respective sample before calcination, except a small shift to higher q position. These results show that the morphologies of the gold nanoparticle superlattices (Au NPSLs) are completely maintained without any deterioration except slight shrinkage, even after calcination at 450° C. In addition, the distances between the nearest neighboring gold nanoparticles of Au-silica-1 and Au-silica-2 were found to be 16.3 nm and 18.5 nm, respectively.

As shown in FIG. 13, the small-angle X-ray scattering measurement results of 4-Au-silica also showed that the superlattice was highly ordered and the FCC symmetry was maintained even after calcination at 450° C.

As shown in FIG. 14 to FIG. 17, the field emission scanning electron microscopy (FE-SEM) images showed that Au-silica-1 and Au-silica-2 both were highly ordered gold nanoparticle superlattice embedded in hierarchical porous silica. The (111) and (100) planes, which are the lowest surface energy facets in FCC crystals, were most frequently observed in the micron-sized faceted superlattices with steps. In addition, the distances between the nearest neighboring gold nanoparticles of Au-silica-1 and Au-silica-2 were found to be 16 nm and 19 nm, respectively, which is consistent with the SAXS results.

As shown in FIG. 18 and FIG. 19, the FE-SEM images showed that both Au-PEG-silica-2 (before calcination) and Au-silica-2 (after calcination) had a superlattice surface morphology. In addition, as indicated by the arrows, mesopores of several nm in size were present between the gold nanoparticles embedded in porous silica.

As shown in FIG. 20 and FIG. 21, the TEM images of Au-silica-1 and Au-silica-2 sliced by focused ion beam indicate that the gold nanoparticles are highly aligned along straight lines in the (111) planes. The spacing between the (111) planes were 13 nm and 15 nm for Au-Silica-1 and Au-Silica-2, respectively, which is consistent with the SAXS and FE-SEM results.

As shown in FIG. 22 and FIG. 23, the TEM images of 4-Au-silica also showed that the 4 nm gold nanoparticles in porous silica were well aligned.

The results show that the gold nanoparticle superlattice embedded in hierarchical porous silica has a highly ordered structure and maintains a stable structure without any deterioration even after calcination at 450° C.

Test Example 2: Nitrogen Adsorption and Desorption Analysis

The nitrogen adsorption and desorption isotherms of the gold nanoparticle superlattice embedded in hierarchical porous silica prepared in Examples 1 and 2 were analyzed. Nitrogen adsorption and desorption measurements were performed using Autosorb-iQ (Quantachrome).

FIG. 24 shows the nitrogen adsorption isotherm of Au-silica-1 according to Example 1, FIG. 25 shows the nitrogen adsorption isotherm of Au-silica-2, and FIG. 26 and FIG. 27 show the pore size distributions of Au-silica-1 and Au-silica-2, respectively.

As shown in FIG. 24 to FIG. 27, the pore size distributions showed clear bimodal distributions with a narrow distribution peaked at about 1 nm (micropores) and a broad distribution ranging from 2 to 10 nm (mesopores). The porosities of Au-silica-1 and Au-silica-2 were 39% and 36%, respectively. The micropores are formed by the pyrolysis of PEG molecules attached to gold nanoparticles during calcination. As shown in the FE-SEM images, the mesopores are interstitial voids between closely packed silica encapsulating gold nanoparticles. This hierarchical pore structure comprising mesopores and micropores allow the rapid access of reactants to surfaces of gold nanoparticles. The small silica shell thickness of 2 to 3 nm is also helpful for the rapid access of reactants. The inductively coupled plasma mass spectroscopy (ICP-MS) measurements also revealed that the contents of gold nanoparticles in Au-silica-1 and Au-silica-2 were 78.9% by weight and 73.4% by weight, respectively.

FIG. 28 and FIG. 29 show the nitrogen adsorption isotherm and the pore size distribution of 4-Au-silica according to Example 2.

As shown in FIG. 28 and FIG. 29, nitrogen adsorption of 4-Au-silica was measured at an isothermal temperature. The pore size distribution showed a clear bimodal distribution with a narrow distribution peaked at about 1 nm (micropores) and a broad distribution ranging from 2 to 10 nm (mesopores). The specific pore volume per mass was 0.0940 $cm^3/g$. Given the mass content of gold nanoparticles (46.8% as measured by ICP-OES), the porosity in the superlattice is calculated to be 29.4%.

The results show that the porous silica encapsulating gold nanoparticles has a hierarchical pore structure comprising mesopores and micropores and that the hierarchical pore structure allows the rapid access of reactants to surfaces of gold nanoparticles.

Test Example 3: Analysis of the Catalytic Activity for Oxidation of Carbon Monoxide (CO)

The catalytic activity of the gold nanoparticle superlattice embedded in hierarchical porous silica according to Example 1 for CO oxidation was measured in a flow reactor connected to a mass flow controller (Line Tech) and gas chromatography (DS Science). Traditionally, gold nanoparticles of 2 to 4 nm in size deposited on a reducible metal oxide such as $TiO_2$ are known to have high catalytic activity for CO oxidation at room temperature. However, no catalytic activity for CO oxidation has been reported for gold nanoparticles of 5 nm or more deposited on silica ($SiO_2$).

FIG. 30 shows the CO conversion rates of Au-silica-1 and Au-silica-2 with varying temperature, FIG. 31 shows the CO conversion rates of Au-silica-1 and 4-Au-silica at room temperature with varying reaction time, FIG. 32 shows a transmission electron microscope (TEM) image of Au-silica-1 after catalytic reaction for 100 hours including 4 times of reactions at a high temperature of 325° C., FIG. 33 shows the CO conversion rates of Au-silica-1, Au-silica-2 and 4-Au-silica with varying CO flow rate, FIG. 34 shows the CO conversion rate of 4-Au-silica at a high space velocity, and FIG. 35 shows the radial distribution function of Au-silica-1 before and after activation. As shown in FIG. 30, the catalytic activities of Au-silica-1 and Au-silica-2 (100 mg for each) according to Example 1 of the present invention for CO oxidation was measured with the gas composition of 1% CO, 10% $O_2$ and 89% He at room temperature and a gas flow rate of 100 ml/min. The result was compared with the CO conversion rate of gold nanoparticles of 12 nm in size dispersed in SBA-16 mesoporous silica (100 mg)(Comparative Example 1) under the same conditions.

Also, the catalytic activities of Au-silica-1, Au-silica-2 (60 mg for each) and 4-Au-silica (30 mg) for CO oxidation were measured with the gas composition of 20% CO, 50% $O_2$ and 30% He at room temperature and a gas flow rate of 100 ml/min (FIG. 33), and the catalytic activity of 4-Ausilica (30 mg) was measured with the gas composition of 1% CO, 10% $O_2$ and 89% He at a space velocity of up to 760 L/hr·g (FIG. 34).

As shown in FIG. 30, Au-silica-1 and Au-silica-2, composed of porous silica encapsulating gold nanoparticles having the average diameter of 12 nm, exhibited catalytic activity for CO oxidation at room temperature and 100% conversion of CO to $CO_2$. The results demonstrated for the first time that gold nanoparticles having the average diameter of 12 nm exhibit a CO conversion rate of 100% at room temperature. Even when the temperature was lowered to −50° C., the superlattice still maintained a CO conversion rate of 100%. In contrast, gold nanoparticles of 12 nm in size dispersed in SBA-16 mesoporous silica (Au/SBA-16) according to Comparative Example 1 did not exhibit any CO conversion at 140° C. or lower.

As shown in FIG. 31, Au-silica-1 showed a CO conversion rate of 100% even after at least about one month of CO oxidation at room temperature, indicating excellent catalytic activity for CO oxidation. 4-Au-silica also showed a CO conversion rate of 100% after at least about one month of CO oxidation at room temperature.

As shown in FIG. 32, the transmission electron microscope (TEM) image of Au-silica-1 after at least 100 hours of catalytic reaction including 4 times of reactions at a high temperature of 325° C. clearly showed individual gold nanoparticles without any agglomeration or sintering. This result indicates that the gold nanoparticles in the superlattice are encapsulated by porous silica shells and thus are very stable.

As shown in FIG. 33, Au-silica-1, Au-silica-2 and 4-Au-silica maintained a CO conversion rate of 100% at room temperature even when the CO concentration was increased by 20 times (the gas composition of 20% CO, 50% $O_2$ and 30% He and the gas flow rate of 100 ml/min). Here, the heat generated by CO oxidation was removed using a dry ice jacket to maintain room temperature.

As shown in FIG. 34, even when the space velocity per gram of 4-Au-silica was increased up to 760 L/hr·g (1% CO, 10% $O_2$, 89% He), the CO conversion rate of 100% was maintained within the whole range of space velocity.

To investigate the origin of high catalytic activity of the gold nanoparticle superlattices embedded in hierarchical porous silica, extended x-ray absorption fine structure (EXAFS) measurements were performed before and after activation for CO oxidation. The radial distribution function was obtained from the EXAFS data.

As shown in FIG. 35, the radial distribution function of Au-silica-1 showed that Au—O component was present in the gold nanoparticle superlattice after activation while it was not observed in the gold nanoparticle superlattice before activation.

As shown in FIG. 36, the radial distribution function of 4-Au-silica also showed that Au—O component was present in the gold nanoparticle superlattice after activation while it was not observed in the gold nanoparticle superlattice before activation. This is very unusual since Au—O complex is known to be spontaneously reduced due to the endothermic chemisorption energy of oxygen on gold. It is believed that the close proximity between the surfaces of gold nanoparticles and porous silica encapsulating them provides a condition to form stable Au—O bonds at the interface between the gold nanoparticles and porous silica, thereby forming Au—O—Si. Since Au-oxide is a reducible metal oxide, the Au—O complexes on gold nanoparticles in the superlattice play the role of a reducible metal oxide support, which is the key element for high catalytic activity of gold catalysts for CO oxidation. Therefore, all the surfaces of gold nanoparticles containing Au—O complexes are accessible by CO and $O_2$ molecules through hierarchical porous pathways, which allows oxidation of CO to $CO_2$ with high catalytic activity.

The results show that Au-silica-1 and Au-silica-2, composed of porous silica encapsulating gold nanoparticles having the average diameter of 12 nm, and 4-Au-silica, composed of porous silica encapsulating gold nanoparticles having the average diameter of 4 nm, form stable Au—O bonds at the interface between the gold nanoparticles and porous silica, thus exhibiting excellent catalytic activity for CO oxidation and achieving a CO conversion rate of 100% at room temperature.

The invention claimed is:

1. A method for manufacturing a catalyst composition, comprising the steps of:
   (1) preparing a dispersion of gold nanoparticles functionalized with thiolated poly(ethylene glycol);
   (2) adding a silica precursor to the dispersion of gold nanoparticles and stirring the dispersion to obtain a precipitate; and
   (3) calcining the precipitate in an inert atmosphere to prepare a gold nanoparticle superlattice embedded in hierarchical porous silica.

2. The method for manufacturing a catalyst composition according to claim 1,
   wherein, in step (1), the thiolated poly(ethylene glycol) has an average molecular weight of 0.1 to 5 kDa.

3. The method for manufacturing a catalyst composition according to claim 1,
   wherein, in step (1), the gold nanoparticles functionalized with thiolated poly(ethylene glycol) have an average hydrodynamic diameter of 20 to 40 nm.

4. The method for manufacturing a catalyst composition according to claim 1,
   wherein, in step (1), the thiolated poly(ethylene glycol) functionalized on the surfaces of gold nanoparticles has an average number density of 2 to 5 nm-2.

5. The method for manufacturing a catalyst composition according to claim 1,
   wherein, in step (2), the silica precursor is at least one selected from the group consisting of tetraethyl orthosilicate, tetramethyl orthosilicate, tetrapropyl orthosilicate, tetrabutyl orthosilicate, tetrachlorosilane, and sodium silicate.

6. The method for manufacturing a catalyst composition according to claim 1,
   wherein, in step (3), the calcination temperature is 400 to 500° C.

* * * * *